US012057042B2

(12) United States Patent
Oh et al.

(10) Patent No.: US 12,057,042 B2
(45) Date of Patent: Aug. 6, 2024

(54) DISPLAY DEVICE

(71) Applicant: Samsung Display Co., Ltd., Yongin-si (KR)

(72) Inventors: Choonghee Oh, Yongin-si (KR); Taehoon Kwon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/213,172

(22) Filed: Jun. 22, 2023

(65) Prior Publication Data

US 2024/0046828 A1 Feb. 8, 2024

(30) Foreign Application Priority Data

Aug. 5, 2022 (KR) ........................ 10-2022-0098100

(51) Int. Cl.
*G09G 3/00* (2006.01)
*G09G 3/20* (2006.01)

(52) U.S. Cl.
CPC ........... *G09G 3/006* (2013.01); *G09G 3/2003* (2013.01); *G09G 2300/0426* (2013.01); *G09G 2300/0452* (2013.01); *G09G 2330/12* (2013.01)

(58) Field of Classification Search
CPC ... G09G 2300/0426; G09G 2300/0408; G09G 2300/0413; G09G 2300/0439
See application file for complete search history.

(56) References Cited

U.S. PATENT DOCUMENTS 9,696,835 B2 7/2017 Her
11,087,654 B2 8/2021 Kwak et al.
11,270,610 B2 3/2022 Shim et al.
11,493,552 B2 11/2022 Song et al.
11,804,161 B1 * 10/2023 Gao ..................... G09G 3/2074
2006/0008932 A1 * 1/2006 Oh ......................... G02F 1/1368 438/34
2016/0104402 A1 4/2016 Kim
2017/0169764 A1 * 6/2017 Lee ...................... G09G 3/3266
2019/0304366 A1 * 10/2019 Ka ...................... G02F 1/13452
(Continued)

FOREIGN PATENT DOCUMENTS

KR 10-2096622 B1 4/2020
KR 10-2270083 B1 6/2021
(Continued)

*Primary Examiner* — Van N Chow
(74) *Attorney, Agent, or Firm* — Lewis Roca Rothgerber Christie LLP

(57) ABSTRACT

A display device includes: a display panel; and an inspection circuit at a non-display area. The display panel includes: first data lines at a display area; first connection lines at the non-display area; second data lines at the display area; and second connection lines at the non-display area. The inspection circuit includes: first transistors to be controlled by a first inspection signal of a first inspection line; second transistors to be controlled by a second inspection signal of a second inspection line; third transistors to be controlled by a third inspection signal of a third inspection line; fourth transistors to be controlled by a fourth inspection signal of a fourth inspection line; fifth transistors to be controlled by a fifth inspection signal of a fifth inspection line; and sixth transistors to be controlled by a sixth inspection signal of a sixth inspection line.

20 Claims, 12 Drawing Sheets

(56) References Cited

U.S. PATENT DOCUMENTS

| | | | | |
|---|---|---|---|---|
| 2023/0245605 | A1 * | 8/2023 | Oh | G09G 3/006<br>345/694 |
| 2023/0306883 | A1 * | 9/2023 | Oh | H01L 27/124 |

FOREIGN PATENT DOCUMENTS

| | | | |
|---|---|---|---|
| KR | 10-2270632 | B1 | 6/2021 |
| KR | 10-2021-0095271 | A | 8/2021 |
| KR | 10-2021-0114577 | A | 9/2021 |

* cited by examiner

DISPLAY DEVICE

CROSS-REFERENCE TO RELATED APPLICATION

This application claims priority to and the benefit of Korean Patent Application No. 10-2022-0098100, filed on Aug. 5, 2022, the entire content of which is incorporated by reference herein.

BACKGROUND

1. Field

Aspects of embodiments of the present disclosure relate to a display device.

2. Description of the Related Art

Multimedia devices, such as televisions, mobile phones, tablet computers, personal computers, navigation devices, and game devices, include a display panel for displaying an image. The display panel includes pixels for generating the image, and signal lines connected to the pixels. As a degree of integration of the elements included in the display panel increases and the number of the signal lines increases, a size of a region in which the signal lines are disposed increases. In order to provide a user with a display device having a display area with a relatively large size with respect to a size of the display device, it may be desirable to reduce the area in which the signal lines are disposed.

The above information disclosed in this Background section is for enhancement of understanding of the background of the present disclosure, and therefore, it may contain information that does not constitute prior art.

SUMMARY

One or more embodiments of the present disclosure are directed to a display device having a reduced non-display area, and including an inspection circuit having an improved defect detection accuracy.

According to one or more embodiments of the present disclosure, a display device includes: a display panel having a display area and a non-display area; and an inspection circuit at the non-display area. The display panel includes: a plurality of first data lines sequentially arranged at the display area; a plurality of first connection lines at the non-display area, and electrically connected to the plurality of first data lines, respectively; a plurality of second data lines sequentially arranged at the display area; and a plurality of second connection lines at the non-display area, and electrically connected to the plurality of second data lines, respectively. The plurality of first connection lines is alternately arranged with the plurality of second connection lines one by one. The inspection circuit includes: a plurality of first transistors configured to be controlled by a first inspection signal of a first inspection line; a plurality of second transistors configured to be controlled by a second inspection signal of a second inspection line; a plurality of third transistors configured to be controlled by a third inspection signal of a third inspection line; a plurality of fourth transistors configured to be controlled by a fourth inspection signal of a fourth inspection line; a plurality of fifth transistors configured to be controlled by a fifth inspection signal of a fifth inspection line; and a plurality of sixth transistors configured to be controlled by a sixth inspection signal of a sixth inspection line. The plurality of first data lines includes a first-first data line, a first-second data line, a first-third data line, and a first-fourth data line that are sequentially arranged. The plurality of second data lines includes a second-first data line, a second-second data line, a second-third data line, and a second-fourth data line that are sequentially arranged. The first-first data line and the first-third data line are electrically connected to the plurality of second transistors, respectively, and electrically connected to the plurality of fourth transistors, respectively. The second-first data line and the second-third data line are electrically connected to the plurality of first transistors, respectively, and electrically connected to the plurality of third transistors, respectively. The first-second data line and the second-second data line are electrically connected to the plurality of fifth transistors, respectively, and the first-fourth data line and the second-fourth data line are electrically connected to the plurality of sixth transistors, respectively.

In an embodiment, the display panel may further include a plurality of intermediate connection lines connected between the plurality of first data lines and the plurality of first connection lines, and the plurality of intermediate connection lines may be located at the display area.

In an embodiment, the plurality of first connection lines may include: a first-first connection line electrically connected to the first-first data line; a first-second connection line electrically connected to the first-second data line; a first-third connection line electrically connected to the first-third data line; and a first-fourth connection line electrically connected to the first-fourth data line. The first-fourth connection line, the first-third connection line, the first-second connection line, and the first-first connection line may be sequentially arranged.

In an embodiment, the display panel may further include: a plurality of first color pixels; a plurality of second color pixels; and a plurality of third color pixels. Each of the first-first data line, the first-third data line, the second-first data line, and the second-third data line may be connected to a corresponding first color pixel from among the plurality of first color pixels and a corresponding third color pixel from among the plurality of third color pixels. Each of the first-second data line, the first-fourth data line, the second-second data line, and the second-fourth data line may be connected to a corresponding second color pixel from among the plurality of second color pixels.

In an embodiment, the plurality of first color pixels may include a red pixel, the plurality of second color pixels may include a green pixel, and the plurality of third color pixels may include a blue pixel.

In an embodiment, the inspection circuit may further include: a first voltage line configured to receive a first lighting voltage; a second voltage line configured to receive a second lighting voltage; and a third voltage line configured to receive a third lighting voltage.

In an embodiment, each of the plurality of first transistors and the plurality of second transistors may be connected to the first voltage line or the second voltage line, each of the plurality of third transistors and the plurality of fourth transistors may be connected to the first voltage line or the second voltage line, and each of the plurality of fifth transistors and the plurality of sixth transistors may be connected to the third voltage line.

In an embodiment, a first transistor connected to the second-first data line from among the plurality of first transistors may be connected to the first voltage line, a third transistor connected to the second-first data line from among the plurality of third transistors may be connected to the second voltage line, a fifth transistor connected to the second-second data line from among the plurality of fifth transistors may be connected to the third voltage line, a first transistor connected to the second-third data line from among the plurality of first transistors may be connected to the second voltage line, a third transistor connected to the second-third data line from among the plurality of third transistors may be connected to the first voltage line, and a sixth transistor connected to the second-fourth data line from among the plurality of sixth transistors may be connected to the third voltage line.

In an embodiment, a second transistor connected to the first-first data line from among the plurality of second transistors may be connected to the first voltage line, a fourth transistor connected to the first-first data line from among the plurality of fourth transistors may be connected to the second voltage line, a fifth transistor connected to the first-second data line from among the plurality of fifth transistors may be connected to the third voltage line, a second transistor connected to the first-third data line from among the plurality of second transistors may be connected to the second voltage line, a fourth transistor connected to the first-third data line from among the plurality of fourth transistors may be connected to the first voltage line, and a sixth transistor connected to the first-fourth data line from among the plurality of sixth transistors may be connected to the third voltage line.

In an embodiment, during an inspection of the display panel by the inspection circuit, the first voltage line may be configured to receive a light emitting voltage, and the second voltage line and the third voltage line may be configured to receive a non-light emitting voltage.

In an embodiment, during the inspection of the display panel by the inspection circuit, the plurality of first transistors, the plurality of fourth transistors, the plurality of fifth transistors, and the plurality of sixth transistors may be configured to be turned on, and the plurality of second transistors and the plurality of third transistors may be configured to be turned off.

In an embodiment, during an inspection of the display panel by the inspection circuit, the first voltage line and the second voltage line may be configured to receive a non-light-emitting voltage, and the third voltage line may be configured to receive a light emitting voltage.

In an embodiment, during the inspection of the display panel by the inspection circuit, the plurality of first transistors, the plurality of fourth transistors, and the plurality of sixth transistors may be configured to be turned on, and the plurality of second transistors, the plurality of third transistors, and the plurality of fifth transistors may be configured to be turned off.

In an embodiment, the inspection circuit may further include: a plurality of seventh transistors configured to be controlled by a seventh inspection signal of a seventh inspection line; a plurality of eighth transistors configured to be controlled by an eighth inspection signal of an eighth inspection line; a plurality of ninth transistors configured to be controlled by a ninth inspection signal of a ninth inspection line; and a plurality of tenth transistors configured to be controlled by a tenth inspection signal of a tenth inspection line. The plurality of seventh transistors may be electrically connected to the first-first data line and the second-first data line, respectively, the plurality of eighth transistors may be electrically connected to the first-second data line and the second-second data line, respectively, the plurality of ninth transistors may be electrically connected to the first-third data line and the second-third data line, respectively, and the plurality of tenth transistors may be electrically connected to the first-fourth data line and the second-fourth data line, respectively.

In an embodiment, during an inspection of the display panel by the inspection circuit, the plurality of seventh transistors and the plurality of eighth transistors may be configured to be turned on, and the plurality of ninth transistors and the plurality of tenth transistors may be configured to be turned off.

In an embodiment, during the inspection of the display panel by the inspection circuit, the first-second data line may be configured to receive the non-light-emitting voltage from the second voltage line via the seventh transistor electrically connected to the first-first data line from among the plurality of seventh transistors, and the eighth transistor electrically connected to the first-second data line from among the plurality of eight transistors, and during the inspection, the second-second data line is configured to receive the non-light-emitting voltage from the first voltage line via the seventh transistor electrically connected to the second-first data line from among the plurality of seventh transistors, and the eighth transistor electrically connected to the second-second data line from among the plurality of eight transistors.

According to one or more embodiments of the present disclosure, a display device includes: a display panel having a display area and a non-display area; and an inspection circuit at the non-display area, and including a plurality of transistors. The display panel includes: a plurality of pixels including a plurality of first color pixels, a plurality of second color pixels, and a plurality of third color pixels; a plurality of first data lines sequentially arranged at the display area along a first direction; a plurality of first connection lines electrically connected to the plurality of first data lines, respectively, and arranged at the non-display area along a direction opposite to the first direction; a plurality of second data lines at the display area along the first direction; and a plurality of second connection lines electrically connected to the plurality of second data lines, respectively, and arranged at the non-display area along the first direction. First color pixels connected to the first data lines from among the plurality of first color pixels and first color pixels connected to the second data lines from among the plurality of first color pixels are electrically connected to a plurality of first transistors and a plurality of second transistors, respectively, from among the plurality of transistors of the inspection circuit, the plurality of first transistors and the plurality of second transistors being configured to be controlled by different inspection signals. Third color pixels connected to the plurality of first data lines from among the plurality of third color pixels and third color pixels connected to the plurality of second data lines from among the plurality of third color pixels are electrically connected to a plurality of third transistors and a plurality of fourth transistors, respectively, from among the plurality of transistors of the inspection circuit, the plurality of third transistor and the plurality of fourth transistors being configured to be controlled by different inspection signals.

In an embodiment, some of the second color pixels and others of the second color pixels from among the plurality of second color pixels may be electrically connected to a plurality of fifth transistors and a plurality of sixth transistors, respectively, from among the plurality of transistors of the inspection circuit, the plurality of fifth transistors and the plurality of sixth transistors being configured to be controlled by different inspection signals.

In an embodiment, the plurality of first data lines may include a first-first data line, a first-second data line, a first-third data line, and a first-fourth data line that may be sequentially arranged, and the plurality of second data lines may include a second-first data line, a second-second data line, a second-third data line, and a second-fourth data line, that may be sequentially arranged. The plurality of first connection lines may include a first-first connection line electrically connected to the first-first data line, a first-second connection line electrically connected to the first-second data line, a first-third connection line electrically connected to the first-third data line, and a first-fourth connection line electrically connected to the first-fourth data line. The first-fourth connection line, the first-third connection line, the first-second connection line, and the first-first connection line may be sequentially arranged.

In an embodiment, the display panel may include a plurality of intermediate connection lines connected between the plurality of first data lines and the plurality of first connection lines, and the plurality of intermediate connection lines may be located at the display area.

According to one or more embodiments of the present disclosure, some fan-out lines extending from first data lines of a first group arranged at (e.g., in or on) an outer portion of the display area from among the data lines may be arranged at (e.g., in or on) the display area. Accordingly, a size of a line arrangement area in the non-display area, which is used to connect the first data lines to a data driver, may be reduced.

According to one or more embodiments of the present disclosure, the emission of a first color pixel connected to the first data line and the emission of a first color pixel connected to the second data line may be controlled by transistors that are controlled in response to different inspection signals from each other. Accordingly, the first lighting voltage may be provided to the first color pixel that is connected to the first data line and the first color pixel that is connected to the second data line at different timings. In a case where the first color pixel connected to the second data line emits light when the first color pixel connected to the first data line emits light, a short-circuit fault that occurs between the lines may be determined. Accordingly, defect detection accuracy with respect to the display panel may be improved, and a manufacturing yield of the display device may be improved.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1A:
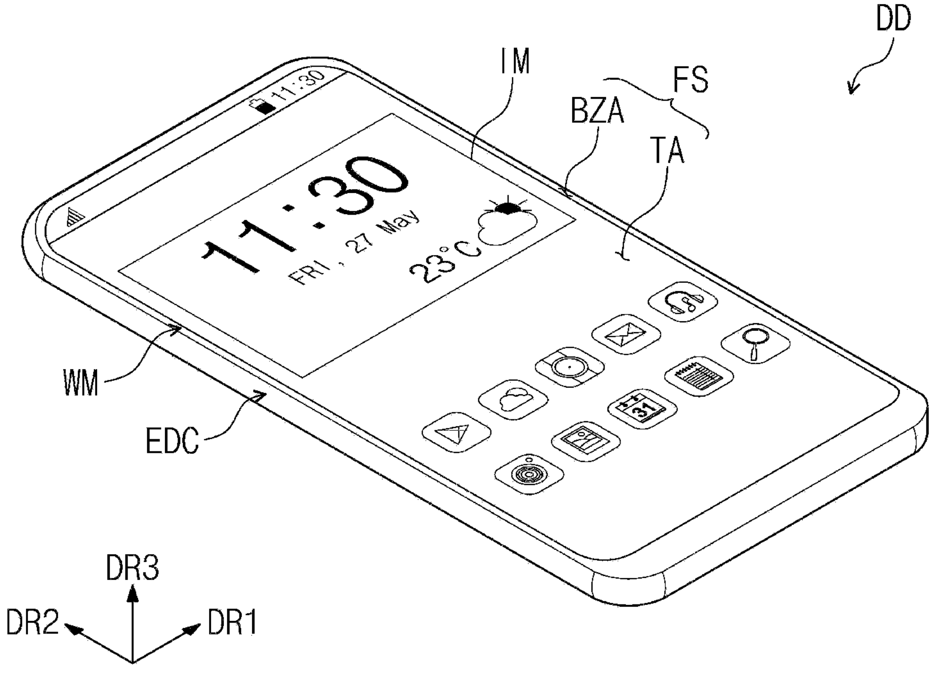
FIG. 1A is a perspective view of a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
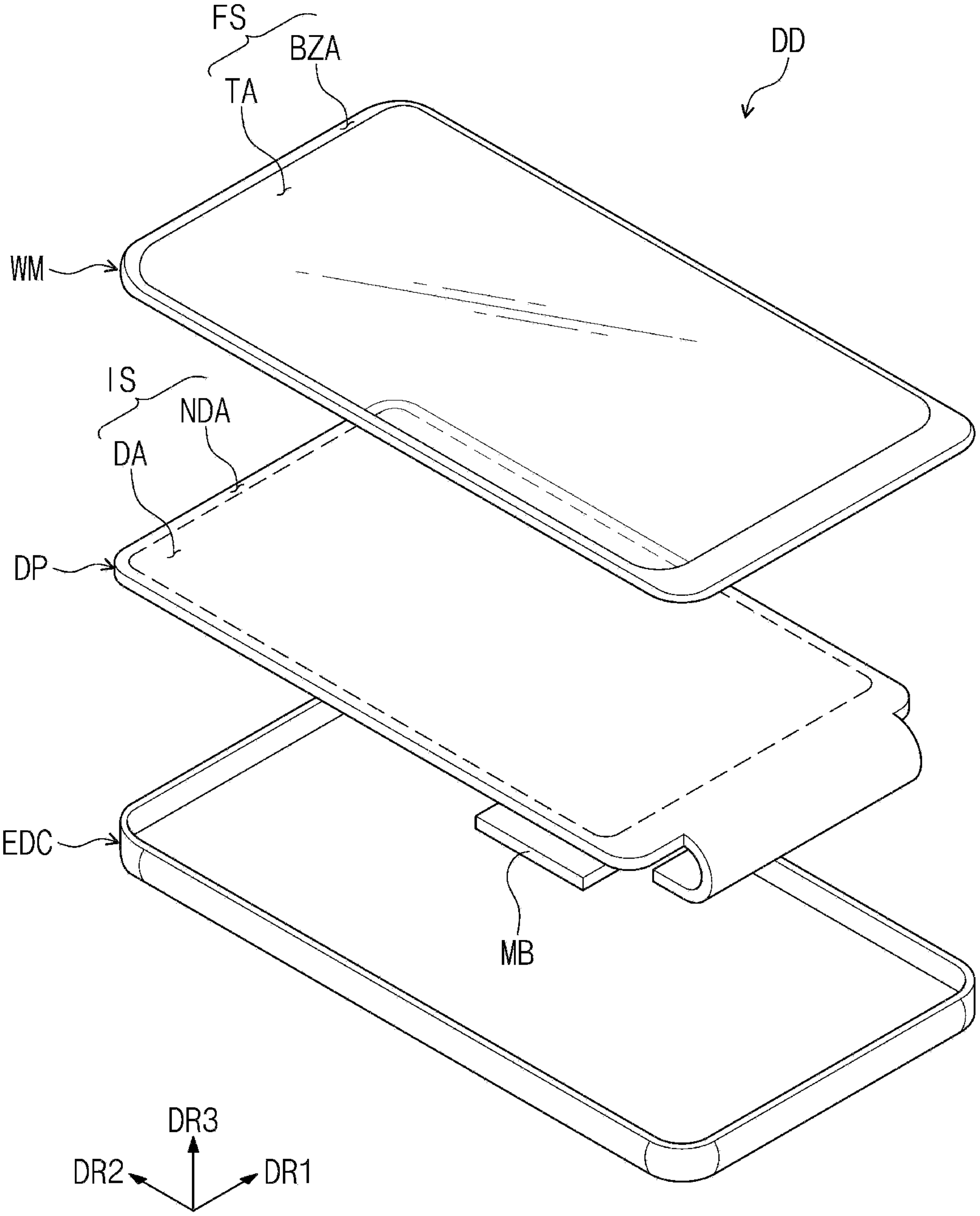
FIG. 1B is an exploded perspective view of a display device according to an embodiment of the present disclosure.

FIG. 1A is a perspective view of a display device DD according to an embodiment of the present disclosure. FIG. 1B is an exploded perspective view of the display device DD according to an embodiment of the present disclosure.

Referring to FIGS. 1A and 1B, the display device DD may be activated in response to electrical signals, and may display an image IM. As an example, the display device DD may be applied to a large-sized electronic device, such as a television set, an outdoor billboard, and the like. In addition, the display device DD may be applied to small and medium-sized electronic devices, such as a monitor, a mobile phone, a tablet computer, a navigation unit (e.g., a navigation device), a game unit (e.g., a gaming device or console), and the like. However, the present disclosure is not limited thereto, and the display device DD may be applied to other suitable electronic devices and display devices. For convenience, the display device DD may be described in more detail hereinafter in the context of the mobile phone as an example.

Referring to FIG. 1, the display device DD may have a quadrangular shape with rounded corners. For example, the display device DD may have short sides extending in a first direction DR1, and long sides extending in a second direction DR2 crossing the first direction DR1. However, the shape of the display device DD is not limited to the rectangular shape, and the display device DD may have a variety of suitable shapes, such as a rectangular shape, a square shape, a circular shape, a polygonal shape, or an irregular shape when viewed in a plane (e.g., in a plan view).

The display device DD according to some embodiments may be flexible. As used herein, the term "flexible" refers to a property of being able to be bent from a structure that is completely bent to a structure that is bent at a scale of a few nanometers. For example, the flexible display device DD may be a curved display device, a foldable display device, a slidable display device, or a rollable display device. According to an embodiment, the display device DD may be rigid.

The display device DD may display the image IM, through a display surface, toward a third direction DR3 that is perpendicular to or substantially perpendicular to a plane defined by the first direction DR1 and the second direction DR2. The image IM provided from the display device DD may include a still image as well as a video. FIG. 1A shows a clock widget and application icons as a representative example of the image IM. The display surface through which the image IM is displayed may correspond to a front surface IS of a display panel DP and a front surface FS of a window WM. FIG. 1 illustrates a flat or substantially flat display surface, but the present disclosure is not limited thereto, and according to an embodiment, the display surface of the display device DD may have a curved shape that is bent from at least one side of the plane.

Front (e.g., upper) and rear (e.g., lower) surfaces of each member of the display device DD may be opposite to each other in the third direction DR3. A normal line direction of each of the front and rear surfaces may be parallel to or substantially parallel to the third direction DR3. A separation distance between the front and rear surfaces of each member in the third direction DR3 may correspond to a thickness of the member in the third direction DR3. As used in the present disclosure, the expressions "when viewed in a plane" and "in a plan view" may refer to a state of being viewed in (or from) the third direction DR3. As used in the present disclosure, the expressions "on a cross-section" and "in a cross-sectional view) may mean a state of being viewed in the first direction DR1 or the second direction DR2. The directions indicated by the first, second, and third directions DR1, DR2, and DR3 may be relative to each other, and thus, the directions indicated by the first, second, and third directions DR1, DR2, and DR3 may be variously modified to other directions.

The display device DD may include the window WM, the display panel DP, and a case EDC. The window WM and the case EDC may be coupled to (e.g., connected to or attached to) each other to form an outer shape of the display device DD, and may provide an inner space in which the components of the display device DD are accommodated.

The window WM may be disposed on the display panel DP. The window WM may have a shape corresponding to a shape of the display panel DP. The window WM may cover an entire external surface of the display panel DP, and may protect the display panel DP from external impacts and scratches.

The window WM may include an optically transparent insulating material. As an example, the window WM may include a glass substrate or a polymer substrate. The window WM may have a single-layer or multi-layered structure. The window WM may further include various suitable functional layers, such as an anti-fingerprint layer, a phase control layer, a hard coating layer, and/or the like, which may be disposed on an optically transparent substrate.

The front surface FS of the window WM may include a transmission area TA and a bezel area BZA. The transmission area TA of the window WM may be an optically transparent area. Accordingly, the window WM may transmit the image IM provided from the display device DD through the transmission area TA, and the user US may view the image IM.

The bezel area BZA of the window WM may be obtained by printing a suitable material having a suitable color (e.g., a predetermined color) on an area of the window WM. The bezel area BZA of the window WM may prevent or substantially prevent the components of the display panel DP, which are disposed to overlap with the bezel area BZA, from being viewed from the outside.

The bezel area BZA may be defined to be adjacent to the transmission area TA, and the shape of the transmission area TA may be defined by the bezel area BZA. As an example, the bezel area BZA may be disposed outside the transmission area TA, and may surround (e.g., around a periphery of) the transmission area TA, but the present disclosure is not limited thereto. For example, the bezel area BZA may be defined to be adjacent to only one side of the transmission area TA, or may be omitted as needed or desired. In addition, the bezel area BZA may be defined at a side surface of the electronic device DD, rather than at the front surface IS of the electronic device DD.

The display panel DP may be disposed between the window WM and the case EDC. The display panel DP may display the image IM in response to electrical signals. According to an embodiment, the display panel DP may be a light-emitting type display panel, but the present disclosure is not limited thereto. For example, the display panel DP may be an organic light emitting display panel, an inorganic light emitting display panel, an organic-inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the organic-inorganic light emitting display panel may include an organic-inorganic light emitting material. A light emitting layer of the quantum dot light emitting display panel may include a quantum dot or a quantum rod.

The image IM provided by the display device DD may be displayed through the front surface IS of the display panel DP. The front surface IS of the display panel DP may include a display area DA and a non-display area NDA. The display area DA of the display panel DP may be activated in response to electrical signals, and the image IM may be displayed through the display area DA. According to an embodiment, the display area DA of the display panel DP may correspond to (e.g., may overlap with) the transmission area TA of the window WM. As used in the present specification, the expression "an area/portion corresponds to another area/portion" means that the area/portion overlaps with the other area/portion, but is not limited to the area/portion having the same area and/or the same shape as the other area/portion.

The non-display area NDA may be defined to be adjacent to an outer side of the display area DA. As an example, the non-display area NDA may surround (e.g., around a periphery of) the display area DA, but the present disclosure is not limited thereto. According to an embodiment, the non-display area NDA may be defined in a variety of suitable shapes.

A driving circuit or a driving line to drive elements arranged at (e.g., in or on) the display area DA, various signal lines to provide electrical signals, and pads may be disposed at (e.g., in or on) the non-display area NDA. The non-display area NDA of the display panel DP may correspond to the bezel area BZA. Components of the display panel DP, which are disposed at (e.g., in or on) the non-display area NDA, may be prevented or substantially prevented from being viewed from the outside by the bezel area BZA.

The display device DD may include a circuit board MB connected to the display panel DP. The circuit board MB may be connected to one end of the display panel DP extending in one direction. The circuit board MB may generate electrical signals provided to the display panel DP. As an example, the circuit board MB may include a timing controller that generates signals provided to a driver of the display panel DP in response to control signals applied thereto from the outside.

At least a portion of the non-display area NDA of the display panel DP may be bent. A portion of the display panel DP, which is connected to the circuit board MB, may be bent, to allow the circuit board MB to face a rear surface of the display panel DP. The circuit board MB may be disposed to overlap with the rear surface of the display panel DP, but the present disclosure is not limited thereto. According to an embodiment, the display panel DP and the circuit board MB may be connected to each other via a flexible circuit board that is connected to ends of the display panel DP and the circuit board MB.

The case EDC may be disposed under the display panel DP, and may accommodate the display panel DP. The case EDC may include glass, plastic, or a metal material with a relatively high strength. The case EDC may absorb impacts applied thereto from the outside, and may prevent or substantially prevent foreign substances and moisture from entering the display panel DP to protect the display panel DP.

The display device DD may further include an input sensing layer disposed on the display panel DP to sense an external input applied thereto from the outside. The input sensing layer may sense the external input provided in various suitable forms, such as force, pressure, temperature, or light. As an example, the input sensing layer may sense an input of a contact of a part of the user's body, such as a user's hand, and/or a proximity or approaching space touch (e.g., such as hovering), which may be some forms of the external input.

In addition, the display device DD may further include an electronic module (e.g., an electronic device or sensor) including a variety of functional modules (e.g., functional devices or sensors) to drive the display panel DP, and a power supply module (e.g., a power supply) for supplying power used for the overall operation of the display device DD. As an example, the display device DD may include a camera module (e.g., a camera) as a representative example of the electronic module.

Figure 2:
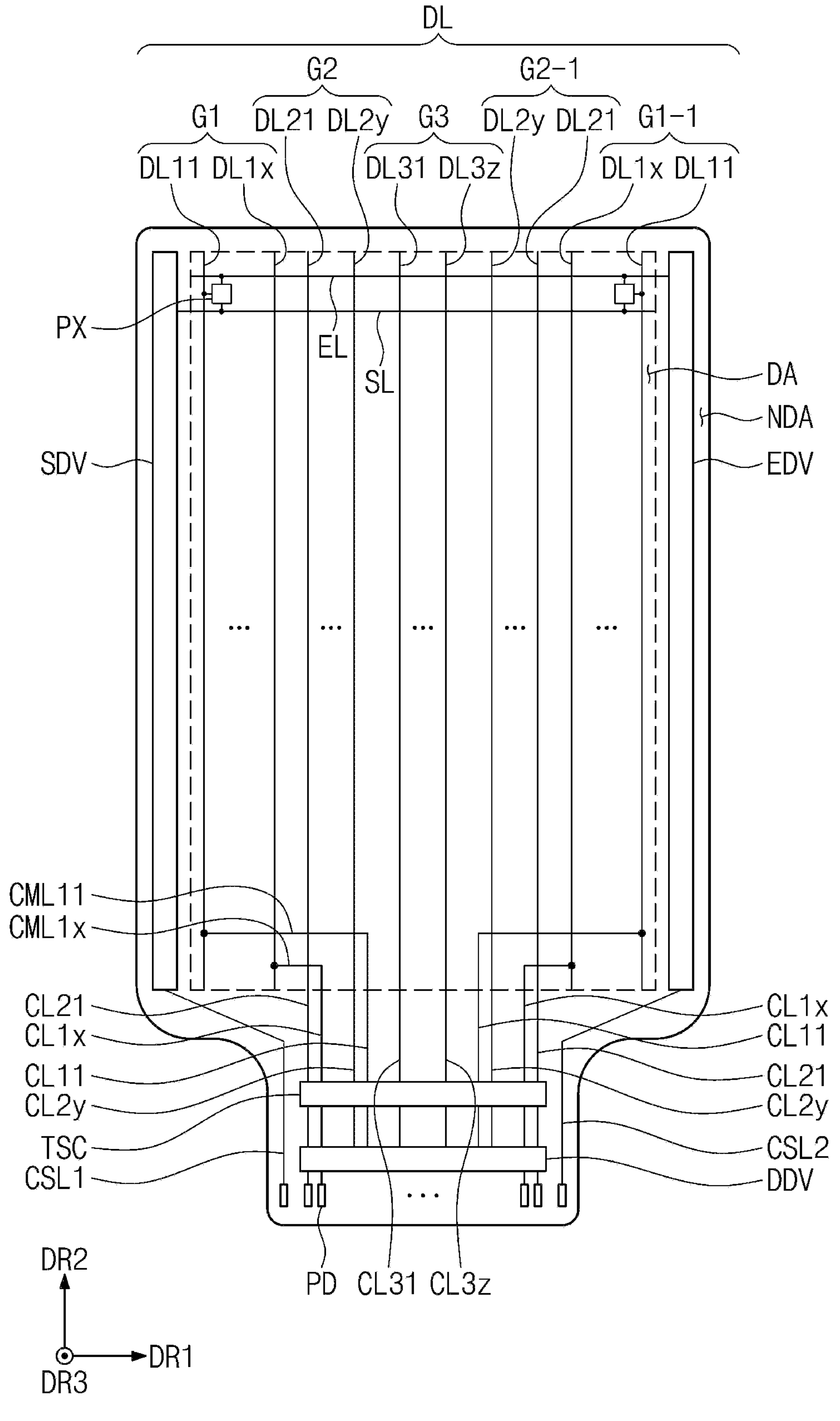
FIG. 2 is a plan view of a display panel according to an embodiment of the present disclosure.

FIG. 2 is a plan view of the display panel DP according to an embodiment of the present disclosure.

Referring to FIG. 2, the display panel DP may include a plurality of pixels PX, a plurality of signal lines electrically connected to the pixels PX, a scan driver SDV, a data driver DDV, an emission controller EDV, and an inspection circuit TSC.

The pixels PX may be arranged at (e.g., in or on) the display area DA. Each of the pixels PX may include a light emitting element, and a pixel driving circuit including a plurality of transistors (e.g., a switching transistor, a driving transistor, and/or the like) connected to the light emitting element, and at least one capacitor. Each of the pixels PX may emit light in response to an electrical signal applied thereto.

Each of the scan driver SDV, the data driver DDV, the emission driver EDV, and the inspection circuit TSC may be disposed at (e.g., in or on) the non-display area NDA of the display panel DP. The scan driver SDV and the emission driver EDV may be disposed at (e.g., in or on) the non-display area NDA to be adjacent to the long sides, respectively, of the display panel DP, but the present disclosure is not limited thereto. According to an embodiment, at least one of the scan driver SDV or the emission driver EDV may be disposed to overlap with the display area DA.

The data driver DDV may be disposed at (e.g., in or on) the non-display area NDA to be adjacent to a short side of the display panel DP. The data driver DDV may be manufactured in (e.g., implemented as) an integrated circuit chip form, and may be mounted on the non-display area NDA of the display panel DP, but the present disclosure is not limited thereto. According to an embodiment, the data driver DDV may be electrically connected to the display panel DP after being mounted on a separate flexible circuit board connected to the display panel DP.

The inspection circuit TSC may be provided between the display area DA and the data driver DDV. However, the position of the inspection circuit TSC is not limited thereto or thereby. As an example, the inspection circuit TSC may be spaced apart from the display area DA, with the data driver DDV interposed therebetween.

The signal lines may include a plurality of scan lines SL, a plurality of data lines DL, a plurality of emission control lines EL, first and second control lines CSL1 and CSL2, and a power line. Each of the pixels PX may be connected to a corresponding scan line from among the scan lines SL, and a corresponding data line from among the data lines DL. Various other suitable signal lines may be provided in the display panel DP according to (e.g., depending on) a configuration of the pixel driving circuits of the pixels PX.

FIG. 2 illustrates one scan line SL from among the scan lines SL and one emission control line EL from among the emission control lines EL as a representative example. The scan line SL may extend in the first direction DR1, and may be connected to the scan driver SDV. The scan line SL may be provided in a plurality, and the plurality of scan lines SL may be arranged along the second direction DR2. The emission control line EL may extend in the first direction DR1, and may be connected to the emission controller EDV. The emission control line EL may be provided in a plurality, and the plurality of emission control lines EL may be arranged along the second direction DR2. The power line may be disposed at (e.g., in or on) the non-display area NDA, and may be connected to the pixels PX via a conductive line. The power line may provide a reference voltage to the pixels PX.

The data lines DL may extend in the second direction DR2, and may be arranged along the first direction DR1. The data lines DL may be grouped into first groups G1 and G1-1, second groups G2 and G2-1, and a third group G3. The first group G1, the second group G2, the third group G3, the second group G2-1, and the first group G1-1 may be sequentially arranged along the first direction DR1. The first and second groups G1 and G2 may have a shape that is symmetrical or substantially symmetrical to that of the second and first groups G2-1 and G1-1 with respect to the third group G3. According to an embodiment, the third group G3 may be omitted as needed or desired, and in this case, the first and second groups G1 and G2 and the second and first groups G2-1 and G1-1 may have shapes that are linearly symmetrical with each other with respect to a reference line (e.g., a predetermined reference line). According to an embodiment, the second and first groups G2-1 and G1-1 may be omitted as needed or desired.

The first group G1 may include a plurality of first data lines DL11 to DL1$x$, the second group G2 may include a plurality of second data lines DL21 to DL2$y$, and the third group G3 may include a plurality of third data lines DL31 to DL3$z$, where x, y, and z are natural numbers. The first data lines DL11 to DL1$x$ may be disposed at (e.g., in or on) the display area DA, and may be sequentially arranged along the first direction DR1. The second data lines DL21 to DL2$y$ may be disposed at (e.g., in or on) the display area DA, and may be sequentially arranged along the first direction DR1. The third data lines DL31 to DL3$z$ may be arranged at (e.g., in or on) the display area DA, and may be sequentially arranged along the first direction DR1.

First connection lines CL11 to CL1$x$ may be arranged at (e.g., in or on) the non-display area NDA, and may be electrically connected to the first data lines DL11 to DL1$x$. An arrangement direction of the first connection lines CL11 to CL1$x$ may be opposite to the arrangement direction of the first data lines DL11 to DL1$x$ electrically connected thereto. Second connection lines CL21 to CL2$y$ may be arranged at (e.g., in or on) the non-display area NDA, and may be electrically connected to the second data lines DL21 to DL2$y$, respectively. An arrangement direction of the second connection lines CL21 to CL2$y$ may be the same or substantially the same as the arrangement direction of the second data lines DL21 to DL2$y$. Third connection lines CL31 to CL3$z$ may be arranged at (e.g., in or on) the non-display area NDA, and may be electrically connected to the third data lines DL31 to DL3$z$, respectively. The first connection lines CL11 to CL1$x$ may be alternately arranged with the second connection lines CL21 to CL2$y$ one by one.

The third connection lines CL31 to CL3*z* may be adjacent to each other, and may be arranged to be spaced apart from each other along the first direction DR1.

A portion of the non-display area NDA in which the first connection lines CL11 to CL1*x*, the second connection lines CL21 to CL2*y*, and the third connection lines CL31 to CL3*z* are arranged may be bent as shown in FIG. 1B. In this case, defects may occur due to a bending operation, and the inspection circuit TSC may be used to detect the defects in the first connection lines CL11 to CL1*x*, the second connection lines CL21 to CL2*y*, and the third connection lines CL31 to CL3*z* arranged in a bending area. In more detail, as the display panel DP has a structure in which the first connection lines CL11 to CL1*x* are alternately arranged with the second connection lines CL21 to CL2*y* one by one, the inspection circuit TSC may have a structure that detects defects between the first connection line and the second connection line, which are adjacent to each other. Accordingly, a defect detection accuracy for the display panel DP may be improved, and because a subsequent process, such as a repair process, may be performed when the defect is detected, a manufacturing yield of the display device DD (e.g., refer to FIG. 1A) may be improved.

The display panel DP may further include a plurality of intermediate connection lines CML11 to CML1*x* connected between the first data lines DL11 to DL1*x* and the first connection lines CL11 to CL1*x*. Portions of the intermediate connection lines CML11 to CML1*x* may be arranged at (e.g., in or on) the display area DA. In other words, portions of fan-out lines extending from the first data lines DL11 to DL1*x* may be disposed at (e.g., in or on) the display area DA. In this case, a size of a line arrangement area of the non-display area NDA, which is used to connect the first data lines DL11 to DL1*x* to the data driver DDV, may be reduced. In other words, a size of the non-display area NDA corresponding to an area between the display area DA and the data driver DDV may be reduced, and thus, a dead space of the display panel DP may be reduced.

The pads PD may be disposed along the first direction DR1, and may be adjacent to a lower end of the non-display area NDA. The pads PD may be disposed closer to the lower end of the display panel DP compared to the data driver DDV. The pads PD may be connected to the circuit board MB (e.g., see FIG. 1B). The pads PD may be electrically connected to the data lines DL, the first control line CSL1, and the second control line CSL2. The power line of the display panel DP may be electrically connected to a corresponding pad PD from among the pads PD.

The first control line CSL1 may be connected to the scan driver SDV. The second control line CSL2 may be connected to the emission controller EDV.

The scan driver SDV may generate a plurality of scan signals in response to a scan control signal. The scan signals may be applied to the pixels PX via the scan lines SL. The data driver DDV may generate a plurality of data voltages corresponding to image signals in response to a data control signal. The data voltages may be applied to the pixels PX via the data lines DL. The emission controller EDV may generate a plurality of emission signals in response to an emission control signal. The emission signals may be applied to the pixels PX via the emission control lines EL.

The pixels PX may receive the data voltages in response to the scan signals. The pixels PX may emit light having a desired luminance corresponding to the data voltages in response to the emission signals, and thus, an image may be displayed. An emission time of the pixels PX may be controlled by the emission signals. Accordingly, the display panel DP may display an image through the display area DA using the pixels PX.

Figure 3A:
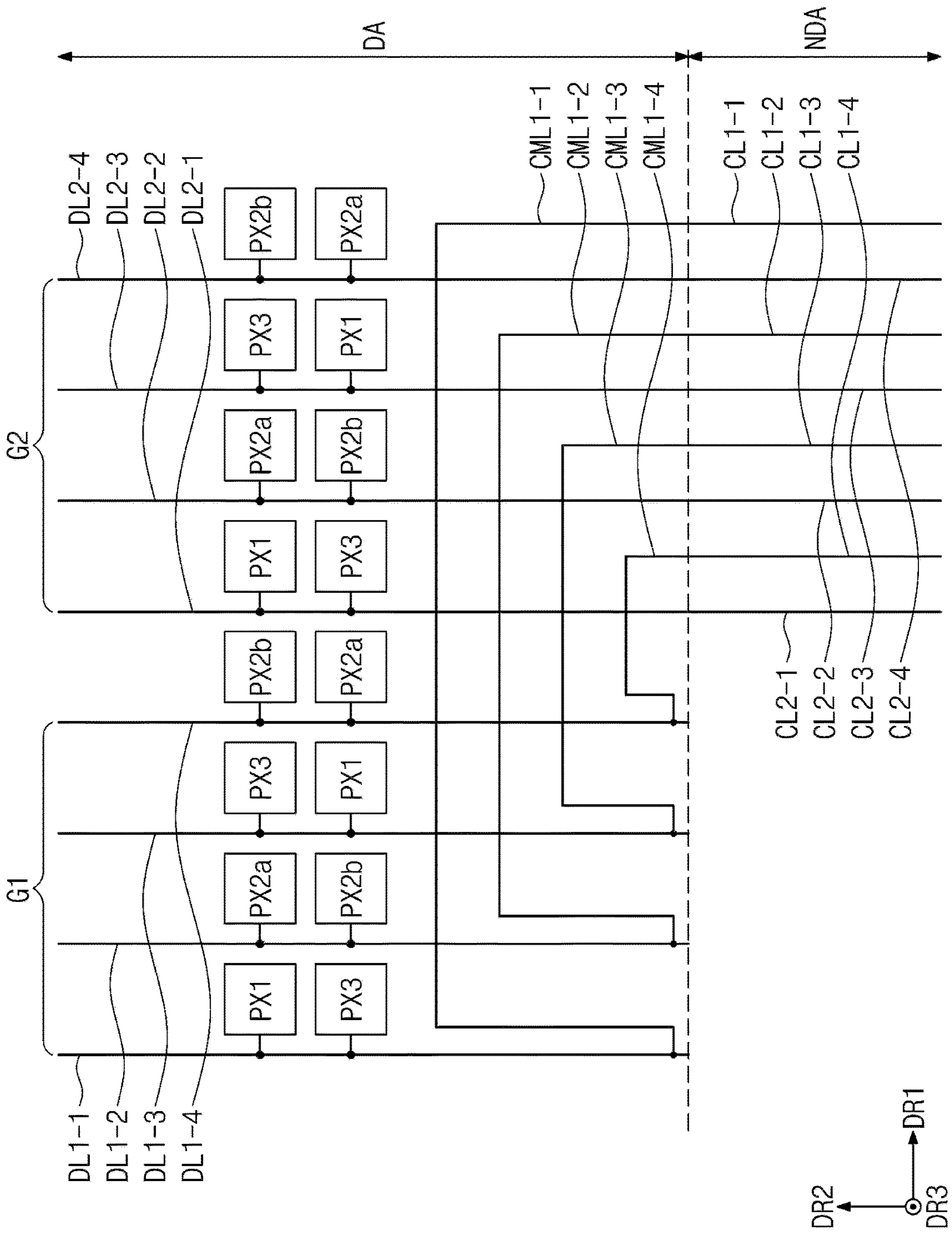
FIG. 3A is an enlarged plan view of a display panel according to an embodiment of the present disclosure.

FIG. 3A is an enlarged plan view of the display panel according to an embodiment of the present disclosure.

Referring to FIGS. 2 and 3A, first data lines DL1-1, DL1-2, DL1-3, and DL1-4 of the first group G1, second data lines DL2-1, DL2-2, DL2-3, and DL2-4 of the second group G2, first connection lines CL1-1, CL1-2, CL1-3, and CL1-4, second connection lines CL2-1, CL2-2, CL2-3, and CL2-4, and intermediate connection lines CML1-1, CML1-2, CML1-3, and CML1-4 are shown as a representative example.

The first data lines DL1-1, DL1-2, DL1-3, and DL1-4 may be referred to as (e.g., may include) a first-first data line DL1-1, a first-second data line DL1-2, a first-third data line DL1-3, and a first-fourth data line DL1-4. The second data lines DL2-1, DL2-2, DL2-3, and DL2-4 may be referred to as (e.g., may include) a second-first data line DL2-1, a second-second data line DL2-2, a second-third data line DL2-3, and a second-fourth data line DL2-4. The first connection lines CL1-1, CL1-2, CL1-3, and CL1-4 may be referred to as (e.g., may include) a first-first connection line CL1-1, a first-second connection line CL1-2, a first-third connection line CL1-3, and a first-fourth connection line CL1-4. The second connection lines CL2-1, CL2-2, CL2-3, and CL2-4 may be referred to as (e.g., may include) a second-first connection line CL2-1, a second-second connection line CL2-2, a second-third connection line CL2-3, and a second-fourth connection line CL2-4.

The pixels PX (e.g., refer to FIG. 2) may include first color pixels PX1, second color pixels PX2*a* and PX2*b*, and third color pixels PX3. The first color pixel PX1, the second color pixel PX2*a*, the third color pixel PX3, and the second color pixel PX2*b* may be sequentially and repeatedly arranged along the first direction DR1 at (e.g., in or on) the display area DA. In addition, the first color pixel PX1 and the third color pixel PX3 may be sequentially and repeatedly arranged along the second direction DR2, and the second color pixel PX2*a* and the second color pixel PX2*b* may be sequentially and repeatedly arranged along the second direction DR2. The first color pixel PX1 may be a red color pixel, the second color pixels PX2*a* and PX2*b* may be green color pixels, and the third color pixel PX3 may be a blue color pixel.

Each of the first-first data line DL1-1, the first-third data line DL1-3, the second-first data line DL2-1, and the second-third data line DL2-3 may be connected to a corresponding first color pixel PX1 and a corresponding third color pixel PX3. Each of the first-second data line DL1-2, the first-fourth data line DL1-4, the second-second data line DL2-2, and the second-fourth data line DL2-4 may be connected to corresponding second color pixels PX2*a* and PX2*b*.

The intermediate connection lines CML1-1, CML1-2, CML1-3, and CML1-4 may be referred to as (e.g., may include) a first intermediate connection line CML1-1, a second intermediate connection line CML1-2, a third intermediate connection line CML1-3, and a fourth intermediate connection line CML1-4. The first intermediate connection line CML1-1 may be connected between the first-first connection line CL1-1 and the first-first data line DL1-1, the second intermediate connection line CML1-2 may be connected between the first-second connection line CL1-2 and the first-second data line DL1-2, the third intermediate connection line CML1-3 may be connected between the first-third connection line CL1-3 and the first-third data line DL1-3, and the fourth intermediate connection line CML1-4 may be connected between the first-fourth connection line CL1-4 and the first-fourth data line DL1-4.

The second-first connection line CL2-1, the first-fourth connection line CL1-4, the second-second connection line CL2-2, the first-third connection line CL1-3, the second-third connection line CL2-3, the first-second connection line CL1-2, the second-fourth connection line CL2-4, and the first-first connection line CL1-1 may be sequentially arranged along the first direction DR1.

The second group G2 and the third group G3 (e.g., refer to FIG. 2) may be distinguished from each other depending on whether or not the second group G2 or the third group G3 overlap with the intermediate connection lines CML1-1, CML1-2, CML1-3, and CML1-4 at (e.g., in or on) the display area DA. As an example, the second group G2 may overlap with the intermediate connection lines CML1-1, CML1-2, CML1-3, and CML1-4, and the third group G3 may not overlap with the intermediate connection lines CML1-1, CML1-2, CML1-3, and CML1-4.

As the intermediate connection lines CML1-1, CML1-2, CML1-3, and CML1-4 are arranged at (e.g., in or on) the display area DA, the intermediate connection lines CML1-1, CML1-2, CML1-3, and CML1-4 may not be arranged at (e.g., in or on) the non-display area NDA below the display area DA where the first group G1 is disposed. Accordingly, a size of the non-display area NDA below the display area DA in which the first group G1 is disposed may be reduced, and thus, the dead space of the display panel DP (e.g., refer to FIG. 2) may be reduced.

The first intermediate connection line CML1-1, the second intermediate connection line CML1-2, the third intermediate connection line CML1-3, and the fourth intermediate connection line CML1-4 may not overlap with each other. Accordingly, the first intermediate connection line CML1-1, the second intermediate connection line CML1-2, the third intermediate connection line CML1-3, and the fourth intermediate connection line CML1-4 may be disposed at (e.g., in or on) the same layer as each other. Accordingly, processes of forming the first intermediate connection line CML1-1, the second intermediate connection line CML1-2, the third intermediate connection line CML1-3, and the fourth intermediate connection line CML1-4 may be simplified.

Figure 3B:
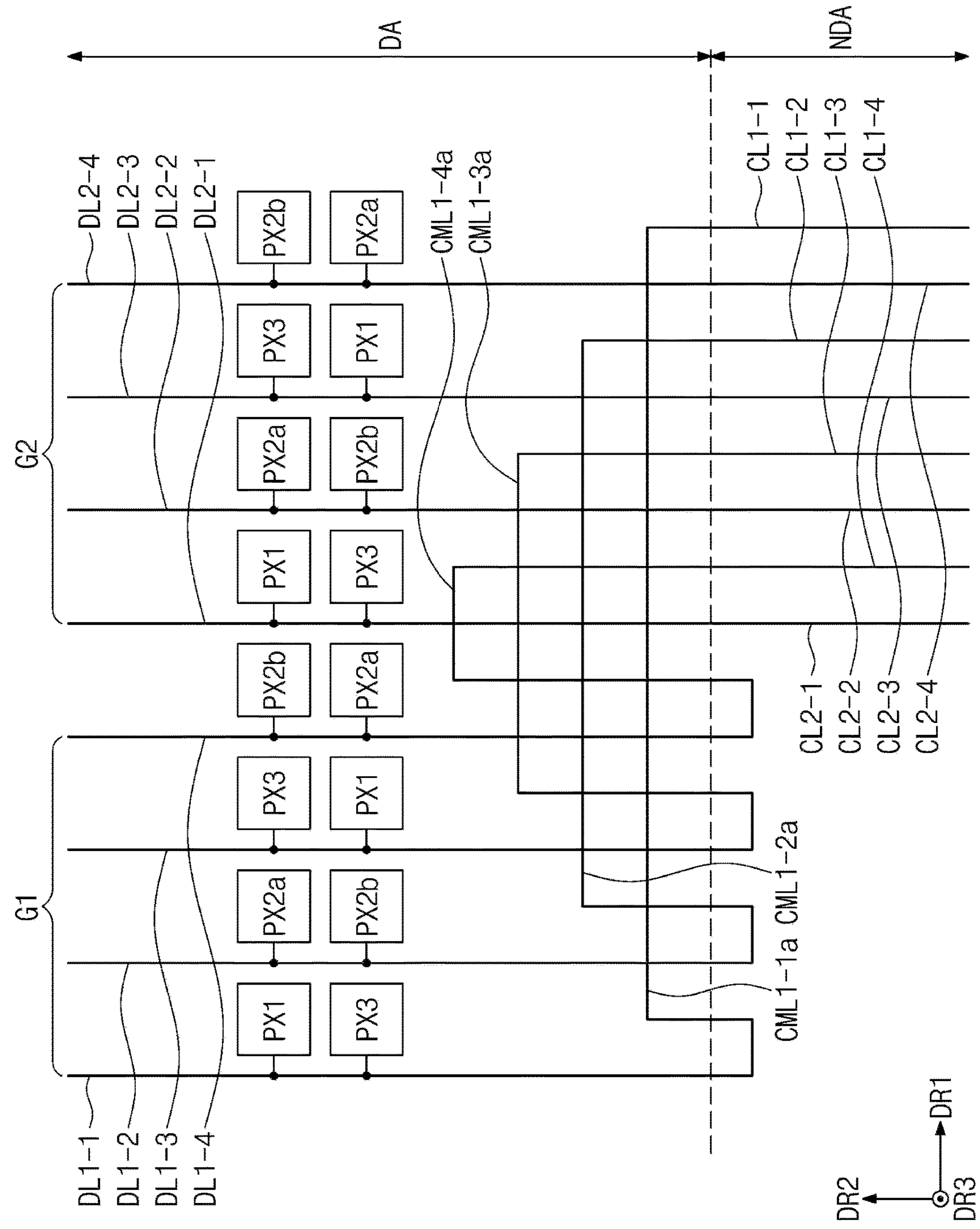
FIG. 3B is an enlarged plan view of a display panel according to an embodiment of the present disclosure.

FIG. 3B is an enlarged plan view of the display panel DP according to an embodiment of the present disclosure. In the following description with reference to FIG. 3B, different features from those described above with reference to FIG. 3A may be mainly described, and redundant description thereof may not be repeated.

Referring to FIGS. 2 and 3B, first data lines DL1-1, DL1-2, DL1-3, and DL1-4 of the first group G1, second data lines DL2-1, DL2-2, DL2-3, and DL2-4 of the second group G2, first connection lines CL1-1, CL1-2, CL1-3, and CL1-4, second connection lines CL2-1, CL2-2, CL2-3, and CL2-4, and intermediate connection lines CML1-1*a*, CML1-2*a*, CML1-3*a*, CML1-4*a* are shown as a representative example.

The intermediate connection lines CML1-1*a*, CML1-2*a*, CML1-3*a*, CML1-4*a* may be referred to as (e.g., may include) a first intermediate connection line CML1-1*a*, a second intermediate connection line CML1-2*a*, a third intermediate connection line CML1-3*a*, and a fourth intermediate connection line CML1-4*a*. A difference in lengths between the first intermediate connection line CML1-1*a*, the second intermediate connection line CML1-2*a*, the third intermediate connection line CML1-3*a*, and the fourth intermediate connection line CML1-4*a* may be less than or equal to a reference length (e.g., a predetermined reference length). In other words, the first intermediate connection line CML1-1*a*, the second intermediate connection line CML1-2*a*, the third intermediate connection line CML1-3*a*, and the fourth intermediate connection line CML1-4*a* may be provided to overlap with each other to reduce the difference in the lengths between the first intermediate connection line CML1-1*a*, the second intermediate connection line CML1-2*a*, the third intermediate connection line CML1-3*a*, and the fourth intermediate connection line CML1-4*a*.

According to an embodiment of the present disclosure, the first intermediate connection line CML1-1*a*, the second intermediate connection line CML1-2*a*, the third intermediate connection line CML1-3*a*, and the fourth intermediate connection line CML1-4*a* may have the same or substantially the same length as each other, and the first intermediate connection line CML1-1*a*, the second intermediate connection line CML1-2*a*, the third intermediate connection line CML1-3*a*, and the fourth intermediate connection line CML1-4*a* may have the same or substantially the same resistance as each other. Here, the length of each of the first intermediate connection line CML1-1*a*, the second intermediate connection line CML1-2*a*, the third intermediate connection line CML1-3*a*, and the fourth intermediate connection line CML1-4*a* may include a sum of a length thereof in the first direction DR1 and a length thereof in the second direction DR2. Accordingly, a difference in resistances between the first intermediate connection line CML1-1*a*, the second intermediate connection line CML1-2*a*, the third intermediate connection line CML1-3*a*, and the fourth intermediate connection line CML1-4*a* may be reduced, and thus, a delay difference between the data signals due to the resistance difference may be reduced.

Figure 4:
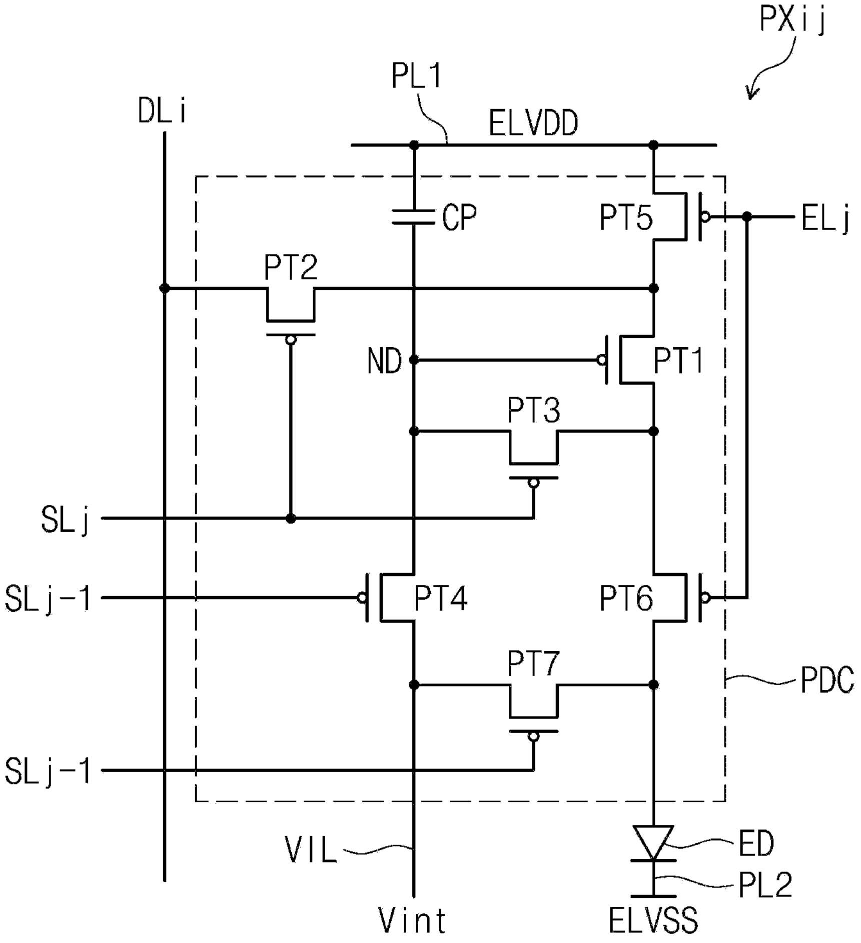
FIG. 4 is an equivalent circuit diagram of a pixel according to an embodiment of the present disclosure.

FIG. 4 is an equivalent circuit diagram of a pixel PXij according to an embodiment of the present disclosure.

Referring to FIG. 4, an equivalent circuit of one pixel PXij from among the pixels PX (e.g., refer to FIG. 2) is shown as a representative example. Because the pixels PX may have the same or substantially the same circuit configuration as each other, the circuit configuration of the pixel PXij will be described in more detail hereinafter, and redundant description of the other pixels PX may not be repeated.

The pixel PXij may be electrically connected to the signal lines. The pixel PXij may be connected to an i-th data line DLi, a j-th scan line SLj, a (j−1)th scan line SLj-1, a j-th emission control line ELj, a first power line PL1, a second power line PL2, and an initialization power line VIL, where i and j are natural numbers. However, the present disclosure is not limited thereto. According to an embodiment, the pixel PXij may be further connected to a variety of suitable signal lines, and/or some of the signal lines illustrated in FIG. 4 may be omitted as needed or desired.

The pixel PXij may include a light emitting element ED and a pixel driving circuit PDC. The light emitting element ED may be a light emitting diode. As an example, the light emitting element ED may be an organic light emitting diode including an organic light emitting layer, but the present disclosure is not limited thereto. The pixel driving circuit PDC may control an amount of current flowing through the light emitting element ED in response to the data signal. The light emitting element ED may emit light having a desired luminance (e.g., a predetermined luminance) corresponding to the amount of current provided from the pixel driving circuit PDC. A first power voltage ELVDD may have a level higher than a level of a second power voltage ELVSS.

The pixel driving circuit PDC may include first, second, third, fourth, fifth, sixth, and seventh pixel transistors PT1, PT2, PT3, PT4, PT5, PT6, and PT7, and a capacitor CP.

However, the configuration of the pixel driving circuit PDC is not limited to the embodiment illustrated in FIG. 4. The pixel driving circuit PDC shown in FIG. 4 is provided as an example, and thus, the configuration of the pixel driving circuit PDC may be variously modified as needed or desired.

Each of the first, second, third, fourth, fifth, sixth, and seventh pixel transistors PT1, PT2, PT3, PT4, PT5, PT6, and PT7 may be a transistor that includes a low-temperature polycrystalline silicon (LTPS) semiconductor layer, but the present disclosure is not limited thereto. As an example, at least some of the first, second, third, fourth, fifth, sixth, and seventh pixel transistors PT1, PT2, PT3, PT4, PT5, PT6, and PT7 may be an LTPS transistor, and others may be an oxide semiconductor transistor including an oxide semiconductor layer. According to an embodiment, all of the first, second, third, fourth, fifth, sixth, and seventh pixel transistors PT1, PT2, PT3, PT4, PT5, PT6, and PT7 may be an oxide semiconductor transistor.

Each of the first, second, third, fourth, fifth, sixth, and seventh pixel transistors PT1, PT2, PT3, PT4, PT5, PT6, and PT7 may be a P-type thin film transistor, but the present disclosure is not limited thereto. As an example, all of the first, second, third, fourth, fifth, sixth, and seventh pixel transistors PT1, PT2, PT3, PT4, PT5, PT6, and PT7 may be an N-type thin film transistor. According to an embodiment, some of the first, second, third, fourth, fifth, sixth, and seventh pixel transistors PT1, PT2, PT3, PT4, PT5, PT6, and PT7 may be a P-type thin film transistor, and others may be an N-type thin film transistor.

A first electrode of the first pixel transistor PT1 may be connected to the first power line PL1 via the fifth pixel transistor PT5. The first power line PL1 may be a line through which the first power voltage ELVDD is provided. A second electrode of the first pixel transistor PT1 may be connected to a first electrode (e.g., the anode) of the light emitting element ED via the sixth pixel transistor PT6. The first pixel transistor PT1 may be referred to as a driving transistor.

The first pixel transistor PT1 may control the amount of current flowing through the light emitting element ED in response to a voltage applied to a control electrode of the first pixel transistor PT1.

The second pixel transistor PT2 may be connected between the data line DLi and the first electrode of the first pixel transistor PT1. A control electrode of the second pixel transistor PT2 may be connected to the j-th scan line SLj. When a j-th scan signal is provided to the j-th scan line SLj, the second pixel transistor PT2 may be turned on, and thus, the data line DLi may be electrically connected to the first electrode of the first pixel transistor PT1.

The third pixel transistor PT3 may be connected to the second electrode of the first pixel transistor PT1 and the control electrode of the first pixel transistor PT1. A control electrode of the third pixel transistor PT3 may be connected to the j-th scan line SLj. When the j-th scan signal is provided to the j-th scan line SLj, the third pixel transistor PT3 may be turned on, and thus, the second electrode of the first pixel transistor PT1 may be electrically connected to the control electrode of the first pixel transistor PT1. Accordingly, when the third pixel transistor PT3 is turned on, the first pixel transistor PT1 may be connected in a diode configuration (e.g., may be diode-connected).

The fourth pixel transistor PT4 may be connected between a node ND and the initialization power line VIL. The fourth pixel transistor PT4 and the control electrode of the first pixel transistor PT1 may be connected to the node ND. A control electrode of the fourth pixel transistor PT4 may be connected to the (j−1)th scan line SLj-1. When a (j−1)th scan signal is provided to the (j−1)th scan line SLj-1, the fourth pixel transistor PT4 may be turned on, and thus, the initialization voltage Vint may be provided to the node ND.

The fifth pixel transistor PT5 may be connected between the first power line PL1 and the first electrode of the first pixel transistor PT1. The sixth pixel transistor PT6 may be connected between the second electrode of the first pixel transistor PT1 and the first electrode of the light emitting element ED. A control electrode of the fifth pixel transistor PT5 and a control electrode of the sixth pixel transistor PT6 may be connected to the j-th emission control line ELj.

The seventh pixel transistor PT7 may be connected between the initialization power line VIL and the first electrode of the light emitting element ED. A control electrode of the seventh pixel transistor PT7 may be connected to the (j−1)th scan line SLj-1. The seventh pixel transistor PT7 may improve a black expression ability of the pixel PXij. When a (j−1)th scan signal is provided to the (j−1)th scan line SL j-1, the seventh pixel transistor PT7 may be turned on, and thus, a parasitic capacitance of the light emitting element ED may be discharged. Accordingly, when implementing a black luminance, the light emitting element ED does not emit light even though a leakage current occurs from the first pixel transistor PT1, and thus, the black expression ability may be improved.

FIG. 4 shows a structure in which the control electrode of the seventh pixel transistor PT7 is connected to the (j−1)th scan line SLj-1, but the present disclosure is not limited thereto. According to an embodiment, the control electrode of the seventh pixel transistor PT7 may be connected to a (j+1)th scan line or the j-th scan line SLj.

The capacitor CP may be connected between the first power line PL1 and the node ND. The capacitor CP may be charged with a voltage corresponding to the data signal. When the fifth pixel transistor PT5 and the sixth pixel transistor PT6 are turned on, the amount of current flowing through the first pixel transistor PT1 may be determined according to the voltage charged in the capacitor CP.

The light emitting element ED may be electrically connected to the sixth pixel transistor PT6 and the second power line PL2. The light emitting element ED may receive the second power voltage ELVSS via the second power line PL2.

The light emitting element ED may emit light in response to the voltage corresponding to a difference between the signal provided through the sixth pixel transistor PT6 and the second power voltage ELVSS provided through the second power line PL2.

Figure 5A:
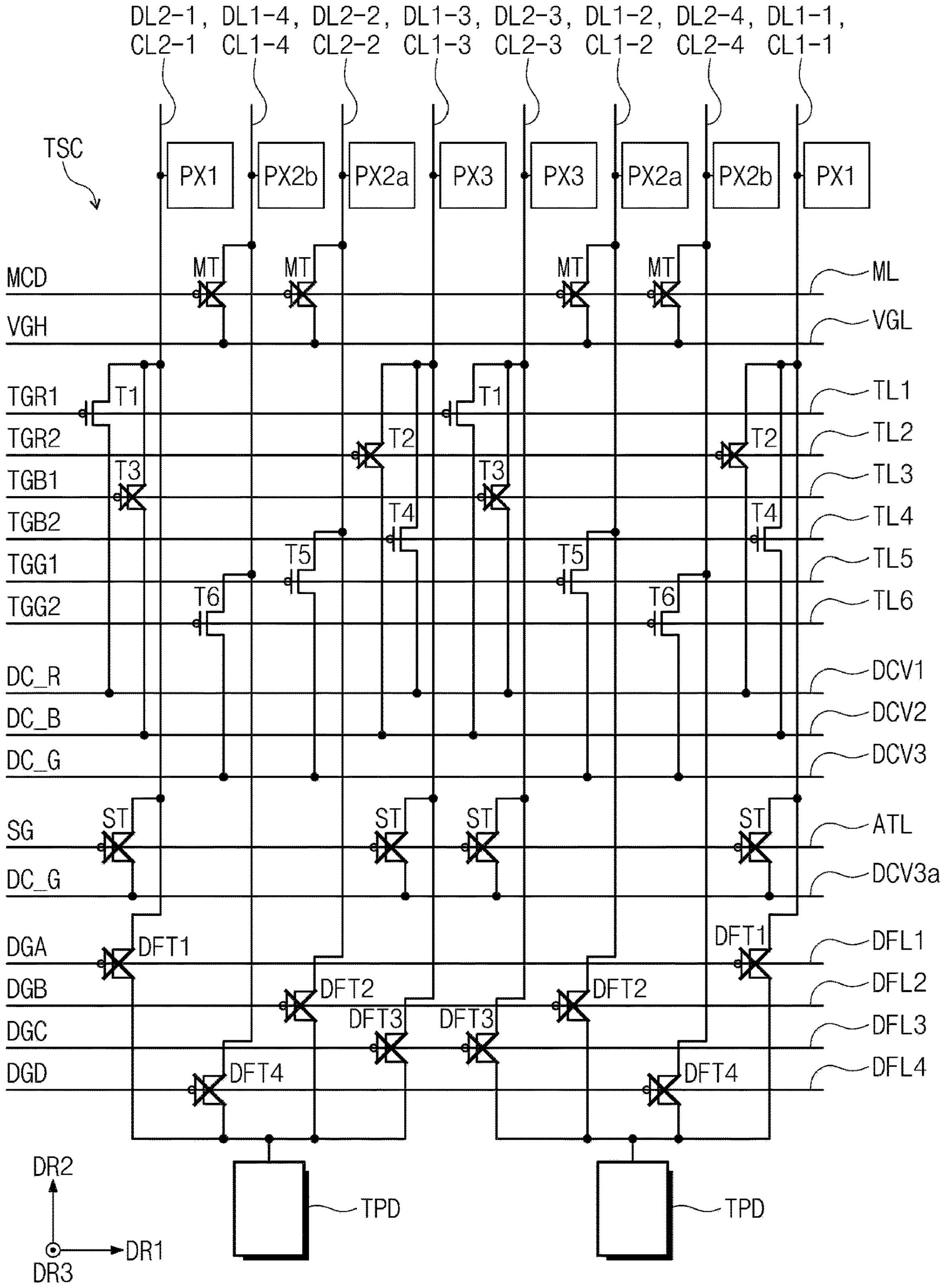
FIG. 5A is a circuit diagram of a portion of an inspection circuit according to an embodiment of the present disclosure.
Figure 5B:
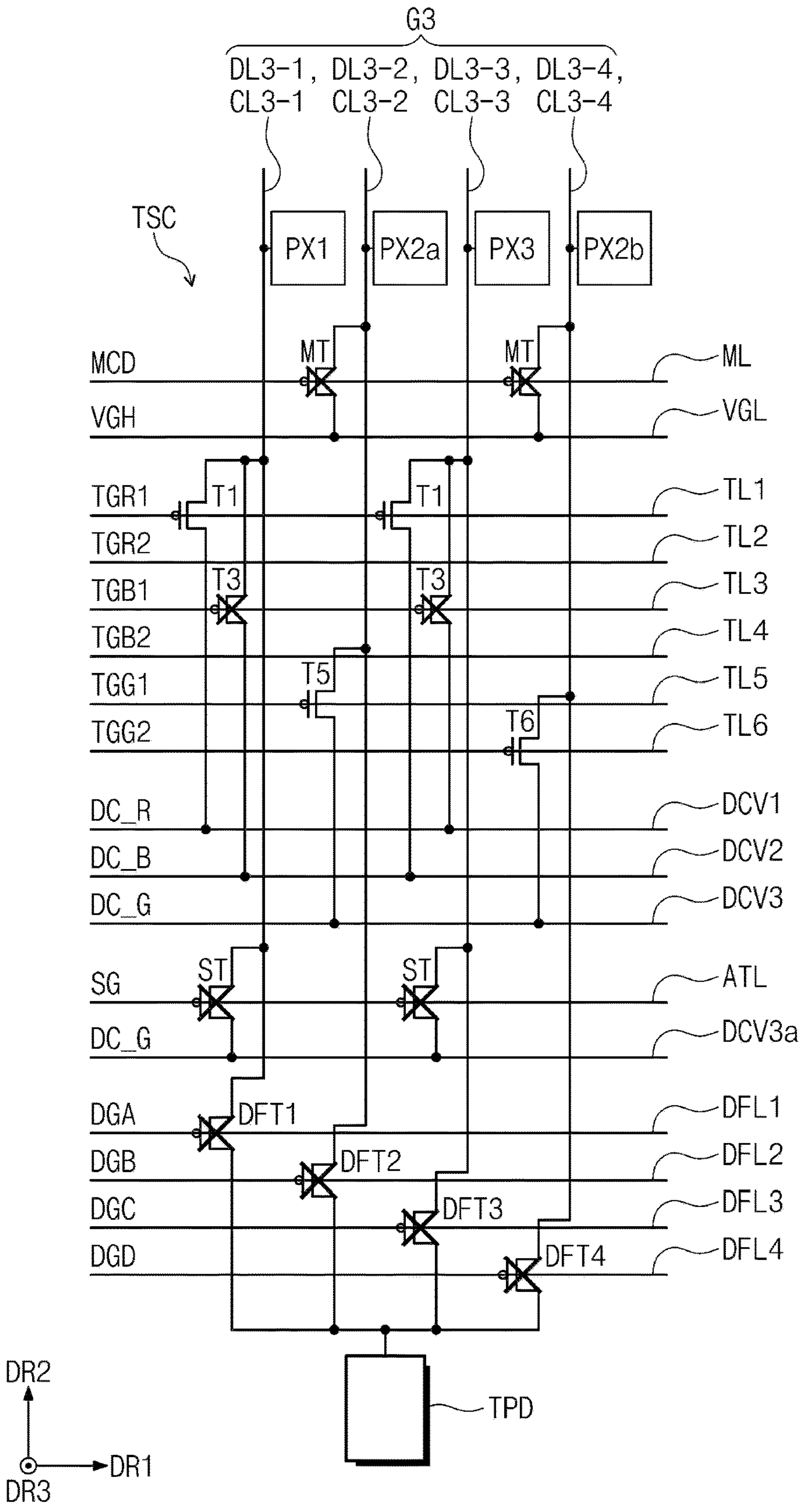
FIG. 5B is a circuit diagram of a portion of an inspection circuit according to an embodiment of the present disclosure.

FIG. 5A is a circuit diagram of a portion of an inspection circuit TSC according to an embodiment of the present disclosure. FIG. 5B is a circuit diagram of a portion of an inspection circuit TSC according to an embodiment of the present disclosure.

FIG. 5A shows a portion of the inspection circuit TSC connected to the first group G1 and the second group G2, and FIG. 5B shows a portion of the inspection circuit TSC connected to the third group G3.

Referring to FIGS. 5A and 5B, the inspection circuit TSC may include first transistors T1 controlled by a first inspection signal TGR1 provided to a first inspection line TL1, second transistors T2 controlled by a second inspection signal TGR2 provided to a second inspection line TL2, third transistors T3 controlled by a third inspection signal TGB1 provided to a third inspection line TL3, fourth transistors T4 controlled by a fourth inspection signal TGB2 provided to a fourth inspection line TL4, fifth transistors T5 controlled by a fifth inspection signal TGG1 provided to a fifth inspection line TL5, and sixth transistors T6 controlled by a sixth inspection signal TGG2 provided to a sixth inspection line TL6.

Referring to FIG. 5B, third data lines DL3-1, DL3-2, DL3-3, and DL3-4 of the third group G3 are shown. The third data lines DL3-1, DL3-2, DL3-3, and DL3-4 may be referred to as (e.g., may include) a third-first data line DL3-1, a third-second data line DL3-2, a third-third data line DL3-3, and a third-fourth data line DL3-4.

Referring to FIGS. 5A and 5B, the first-first data line DL1-1 and the first-third data line DL1-3 may be electrically connected to the second transistors T2, and may be electrically connected to the fourth transistors T4. In other words, the first-first data line DL1-1 may be electrically connected to one second transistor T2 and one fourth transistor T4, and the first-third data line DL1-3 may be electrically connected to one second transistor T2 and one fourth transistor T4. The second-first data line DL2-1, the second-third data line DL2-3, the third-first data line DL3-1, and the third-third data line DL3-3 may be electrically connected to the first transistors T1, and may be electrically connected to the third transistors T3. The first-second data line DL1-2, the second-second data line DL2-2, and the third-second data line DL3-2 may be electrically connected to the fifth transistors T5. The first-fourth data line DL1-4, the second-fourth data line DL2-4, and the third-fourth data line DL3-4 may be electrically connected to the sixth transistors T6.

The inspection circuit TSC may further include a first voltage line DCV1 to which a first lighting voltage DC_R is provided, a second voltage line DCV2 to which a second lighting voltage DC_B is provided, and a third voltage line DCV3 to which a third lighting voltage DC_G is provided.

Each of the first transistors T1, the second transistors T2, the third transistors T3, and the fourth transistors T4 may be connected to the first voltage line DCV1 or the second voltage line DCV2. The fifth transistors T5 and the sixth transistors T6 may be connected to the third voltage line DCV3.

As an example, the second transistor T2 connected to the first-first data line DL1-1 may be connected to the first voltage line DCV1, the fourth transistor T4 connected to the first-first data line DL1-1 may be connected to the second voltage line DCV2, the fifth transistor T5 connected to the first-second data line DL1-2 may be connected to the third voltage line DCV3, the second transistor T2 connected to the first-third data line DL1-3 may be connected to the second voltage line DCV2, the fourth transistor T4 connected to the first-third data line DL1-3 may be connected to the first voltage line DCV1, and the sixth transistor T6 connected to the first-fourth data line DL1-4 may be connected to the third voltage line DCV3.

The first transistor T1 connected to the second-first data line DL2-1 may be connected to the first voltage line DCV1, the third transistor T3 connected to the second-first data line DL2-1 may be connected to the second voltage line DCV2, the fifth transistor T5 connected to the second-second data line DL2-2 may be connected to the third voltage line DCV3, the first transistor T1 connected to the second-third data line DL2-3 may be connected to the second voltage line DCV2, the third transistor T3 connected to the second-third data line DL2-3 may be connected to the first voltage line DCV1, and the sixth transistor T6 connected to the second-fourth data line DL2-4 may be connected to the third voltage line DCV3.

The first transistor T1 connected to the third-first data line DL3-1 may be connected to the first voltage line DCV1, the third transistor T3 connected to the third-first data line DL3-1 may be connected to the second voltage line DCV2, the fifth transistor T5 connected to the third-second data line DL3-2 may be connected to the third voltage line DCV3, the first transistor T1 connected to the third-third data line DL3-3 may be connected to the second voltage line DCV2, the third transistor T3 connected to the third-third data line DL3-3 may be connected to the first voltage line DCV1, and the sixth transistor T6 connected to the third-fourth data line DL3-4 may be connected to the third voltage line DCV3.

The inspection circuit TSC may further include seventh transistors DFT1 controlled by a seventh inspection signal DGA provided to a seventh inspection line DFL1, eighth transistors DFT2 controlled by an eighth inspection signal DGB provided to an eighth inspection line DFL2, ninth transistors DFT3 controlled by a ninth inspection signal DGC provided to a ninth inspection line DFL3, and tenth transistors DFT4 controlled by a tenth inspection signal DGD provided to a tenth inspection line DFL4.

The seventh, eighth, ninth, and tenth transistors DFT1, DFT2, DFT3, and DFT4 may be used in multiple inspection processes. As an example, the seventh, eighth, ninth, and tenth transistors DFT1, DFT2, DFT3, and DFT4 may be used to selectively provide a pre-lighting test voltage applied thereto via the test pad TPD to the data lines DL (e.g., refer to FIG. 2). The first-first data line DL1-1, the second-first data line DL2-1, and the third-first data line DL3-1 may be electrically connected to the seventh transistors DFT1, the first-second data line DL1-2, the second-second data line DL2-2, and the third-second data line DL3-2 may be electrically connected to the eighth transistors DFT2, the first-third data line DL1-3, the second-third data line DL2-3, and the third-third data line DL3-3 may be electrically connected to the ninth transistors DFT3, and the first-fourth data line DL1-4, the second-fourth data line DL2-4, and the third-fourth data line DL3-4 may be electrically connected to the tenth transistors DFT4, respectively.

The inspection circuit TSC may further include a crack inspection control line ML for receiving a crack inspection signal MCD, and a crack detection line VGL for receiving a crack detection voltage VGH. In addition, the inspection circuit TSC may further include crack inspection transistors MT controlled by the crack inspection signal MCD, and connected to the crack detection line VGL. The first-second data line DL1-2, the first-fourth data line DL1-4, the second-second data line DL2-2, the second-fourth data line DL2-4, the third-second data line DL3-2, and the third-fourth data line DL3-4 may be electrically connected to the crack inspection transistors MT, respectively.

The crack detection line VGL may pass through the non-display area NDA (e.g., refer to FIG. 2). As an example, the crack detection line VGL may have a shape surrounding (e.g., around a periphery of) at least a portion of the display area DA (e.g., refer to FIG. 2). The inspection process to detect cracks occurring around the display area DA of the display panel DP (e.g., refer to FIG. 2) may be performed using the crack inspection control line ML, the crack inspection transistors MT, and the crack detection line VGL.

The inspection circuit TSC may further include an additional inspection control line ATL for receiving an additional inspection signal SG, and an additional third voltage line DCV3*a* for receiving the third lighting voltage DC_G. In addition, the inspection circuit TSC may further include additional inspection transistors ST controlled by the additional inspection signal SG, and connected to the additional third voltage line DCV3*a*. The first-first data line DL1-1, the first-third data line DL1-3, the second-first data line DL2-1, the second-third data line DL2-3, the third-first data line DL3-1, and the third-third data line DL3-3 may be electrically connected to the additional inspection transistors ST. The additional third voltage line DCV3*a* may receive the same voltage as that of the third voltage line DCV3. Accordingly, the additional inspection transistors ST, the fifth transistors T5, and the sixth transistors T6 may be activated, and thus, all the pixels PX included in the display panel DP (e.g., refer to FIG. 2) may receive the same or substantially the same voltage.

Figure 6:
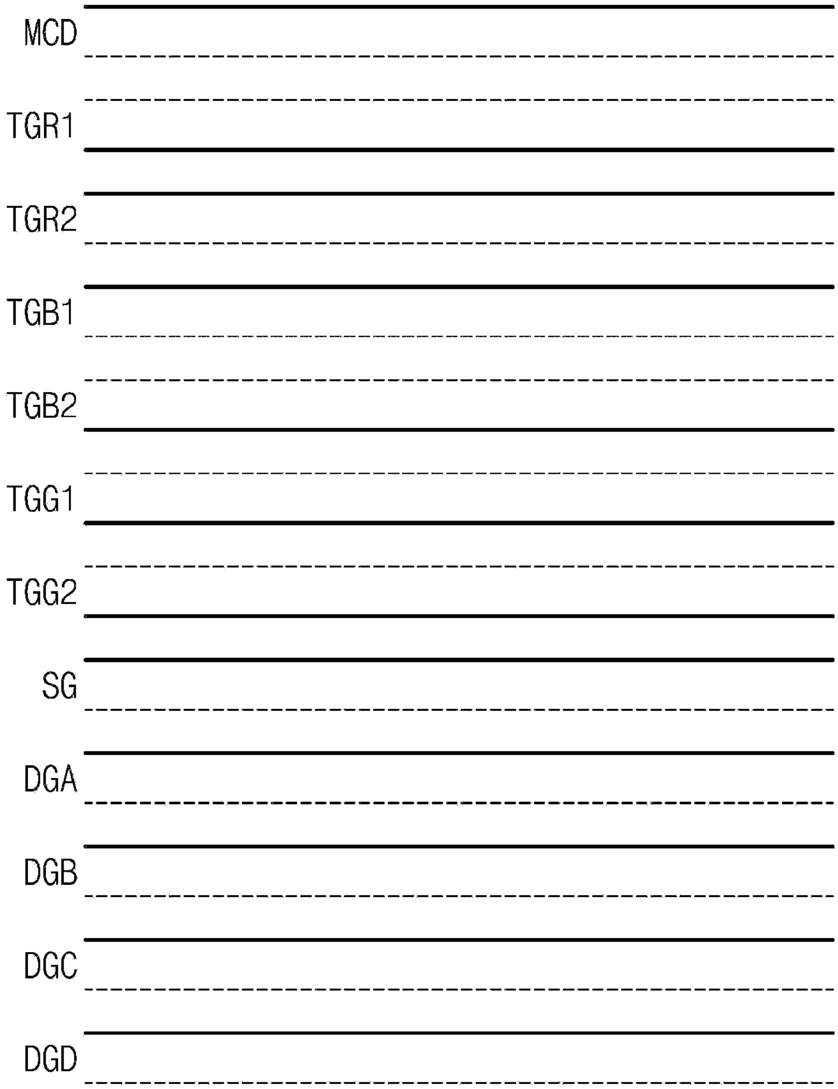
FIG. 6 is a timing diagram illustrating an inspection operation according to an embodiment of the present disclosure.

FIG. 6 is a timing diagram illustrating an inspection operation according to an embodiment of the present disclosure.

Referring to FIGS. 5A, 5B, and 6, the first, second, third, fourth, fifth, and sixth transistors T1, T2, T3, T4, T5, and T6, the seventh, eighth, ninth, and tenth transistors DFT1, DFT2, DFT3, and DFT4, the crack inspection transistors MT, and the additional inspection transistors ST may be P-type thin film transistors. Accordingly, when signals applied to the first, second, third, fourth, fifth, and sixth transistors T1, T2, T3, T4, T5, and T6, the seventh, eighth, ninth, and tenth transistors DFT1, DFT2, DFT3, and DFT4, the crack inspection transistors MT, and the additional inspection transistors ST have a low level, the first, second, third, fourth, fifth, and sixth transistors T1, T2, T3, T4, T5, and T6, the seventh, eighth, ninth, and tenth transistors DFT1, DFT2, DFT3, and DFT4, the crack inspection transistors MT, and the additional inspection transistors ST may be activated (e.g., turned on). On the other hand, when the signals have a high level, the first, second, third, fourth, fifth, and sixth transistors T1, T2, T3, T4, T5, and T6, the seventh, eighth, ninth, and tenth transistors DFT1, DFT2, DFT3, and DFT4, the crack inspection transistors MT, and the additional inspection transistors ST may be deactivated (e.g., turned off).

When a first inspection is performed on the display panel DP, the crack inspection signal MCD, the second inspection signal TGR2, the third inspection signal TGB1, the additional inspection signal SG, and the seventh, eighth, ninth, and tenth inspection signals DGA, DGB, DGC, and DGD may have the high level, and the first inspection signal TGR1, the fourth inspection signal TGB2, the fifth inspection signal TGG1, and the sixth inspection signal TGG2 may have the low level. Accordingly, the crack inspection transistors MT, the second and third transistors T2 and T3, the additional inspection transistors ST, and the seventh, eighth, ninth, and tenth transistors DFT1, DFT2, DFT3, and DFT4 may be turned off, and the first, fourth, fifth, and sixth transistors T1, T4, T5, and T6 may be turned on. In addition, a light emitting voltage may be provided to the first voltage line DCV1, and a non-light-emitting voltage may be provided to the second voltage line DCV2 and the third voltage line DCV3. In other words, the first lighting voltage DC_R may have a voltage level corresponding to a level of the light emitting voltage, and the second lighting voltage DC_B and the third lighting voltage DC_G may have a voltage level corresponding to a level of the non-light-emitting voltage.

When the first inspection is performed on the display panel DP, the first lighting voltage DC_R may be provided to the second-first connection line CL2-1, the first-third connection line CL1-3, and the third-first connection line CL3-1, the second lighting voltage DC_B may be provided to the second-third connection line CL2-3, the first-first connection line CL1-1, and the third-second connection line CL3-2, and the third lighting voltage DC_G may be provided to the first-fourth connection line CL1-4, the second-second connection line CL2-2, the first-second connection line CL1-2, the second-fourth connection line CL2-4, the third-second connection line CL3-2, and the third-fourth connection line CL3-4. Accordingly, during a normal state, the pixels PX electrically connected to the second-first connection line CL2-1, the first-third connection line CL1-3, and the third-first connection line CL3-1 may emit light, and the other pixels PX may not emit the light.

The connection lines CL2-1, CL1-4, CL2-2, CL1-3, CL2-3, CL1-2, CL2-4, and CL1-1 shown in FIG. 5A may be repeatedly arranged along the first direction DR1 at (e.g., in or on) the non-display area NDA (e.g., refer to FIG. 2). The connection lines CL3-1, CL3-2, CL3-3, and CL3-4 shown in FIG. 5B may be repeatedly arranged along the first direction DR1 at (e.g., in or on) the non-display area NDA (e.g., refer to FIG. 2).

Referring to FIG. 5A, two connection lines, which are most adjacent (e.g., closest) to each other, from among the connection lines CL2-1, CL1-4, CL2-2, CL1-3, CL2-3, CL1-2, CL2-4, and CL1-1 may be connected to the pixels PX, respectively, that emit light having the same color as each other. As an example, the first-third connection line CL1-3 and the second-third connection line CL2-3 may be connected to the third color pixels PX3, respectively. In addition, because the connection lines CL2-1, CL1-4, CL2-2, CL1-3, CL2-3, CL1-2, CL2-4, and CL1-1 are repeatedly arranged, the first-first connection line CL1-1 that comes last in one repeat group and a second-first connection line CL2-1 that comes first in a next repeat group may be connected to the first color pixels PX1, respectively.

According to an embodiment of the present disclosure, the emission of the first color pixel PX1 connected to the first data lines DL11 to DL1*x* (e.g., refer to FIG. 2) included in the first group G1 may be controlled by the second transistor T2 controlled by the second inspection signal TGR2, and the emission of the first color pixel PX1 connected to the second data lines DL21 to DL2*y* included in the second group G2 may be controlled by the first transistor T1 controlled by the first inspection signal TGR1. Accordingly, the first lighting voltage DC_R may be controlled to be provided to the first-first connection line CL1-1 and the second-first connection line CL2-1 at different timings.

As shown in FIG. 5A, when the first lighting voltage DC_R is provided to the second-first connection line CL2-1, the first lighting voltage DC_R may not be provided to the first-first connection line CL1-1. Accordingly, in a case where the first color pixel PX1 connected to the first-first connection line CL1-1 emits light when the first color pixel PX1 connected to the second-first connection line CL2-1 emits light, an occurrence of a short-circuit fault that may occur between the second-first connection line CL2-1 and the first-first connection line CL1-1 may be detected. Accordingly, a defect detection accuracy with respect to the display panel DP may be improved, and when the defect is detected, a subsequent process (e.g., a repair process) may be performed. Thus, a manufacturing yield of the display device DD may be improved.

According to an embodiment, the emission of the third color pixel PX3 connected to the first data lines DL11 to DL1*x* (e.g., refer to FIG. 2) included in the first group G1 may be controlled by the fourth transistor T4 controlled by the fourth inspection signal TGB2, and the emission of the third color pixel PX3 connected to the second data lines DL21 to DL2*y* included in the second group G2 may be controlled by the third transistor T3 controlled by the third inspection signal TGB1. Accordingly, the first lighting voltage DC_R may be controlled to be provided to the first-third connection line CL1-3 and the second-third connection line CL2-3 at different timings.

As shown in FIG. 5A, when the first lighting voltage DC_R is provided to the first-third connection line CL1-3, the first lighting voltage DC_R may not be provided to the second-third connection line CL2-3. Accordingly, in a case where the third color pixel PX3 connected to the second-third connection line CL2-3 emits light when the third pixel PX3 connected to the first-third connection line CL1-3 emits light, an occurrence of a short-circuit fault that may occur between the second-third connection line CL2-3 and the first-third connection line CL1-3 may be detected.

Referring to FIG. 5B, the pixels PX connected to two connection lines, which are most adjacent (e.g., closest) to each other, from among the connection lines CL3-1, CL3-2, CL3-3, and CL3-4 may provide light having different colors from each other. Accordingly, in a case where the second color pixel PX2*a* connected to the third-second connection line CL3-2 or the second color pixel connected to the third-fourth connection line is turned on when the first color pixel PX1 connected to the third-first connection line CL3-1 is turned on, the occurrence of the short-circuit fault that may occur between the lines may be detected.

Figure 7A:
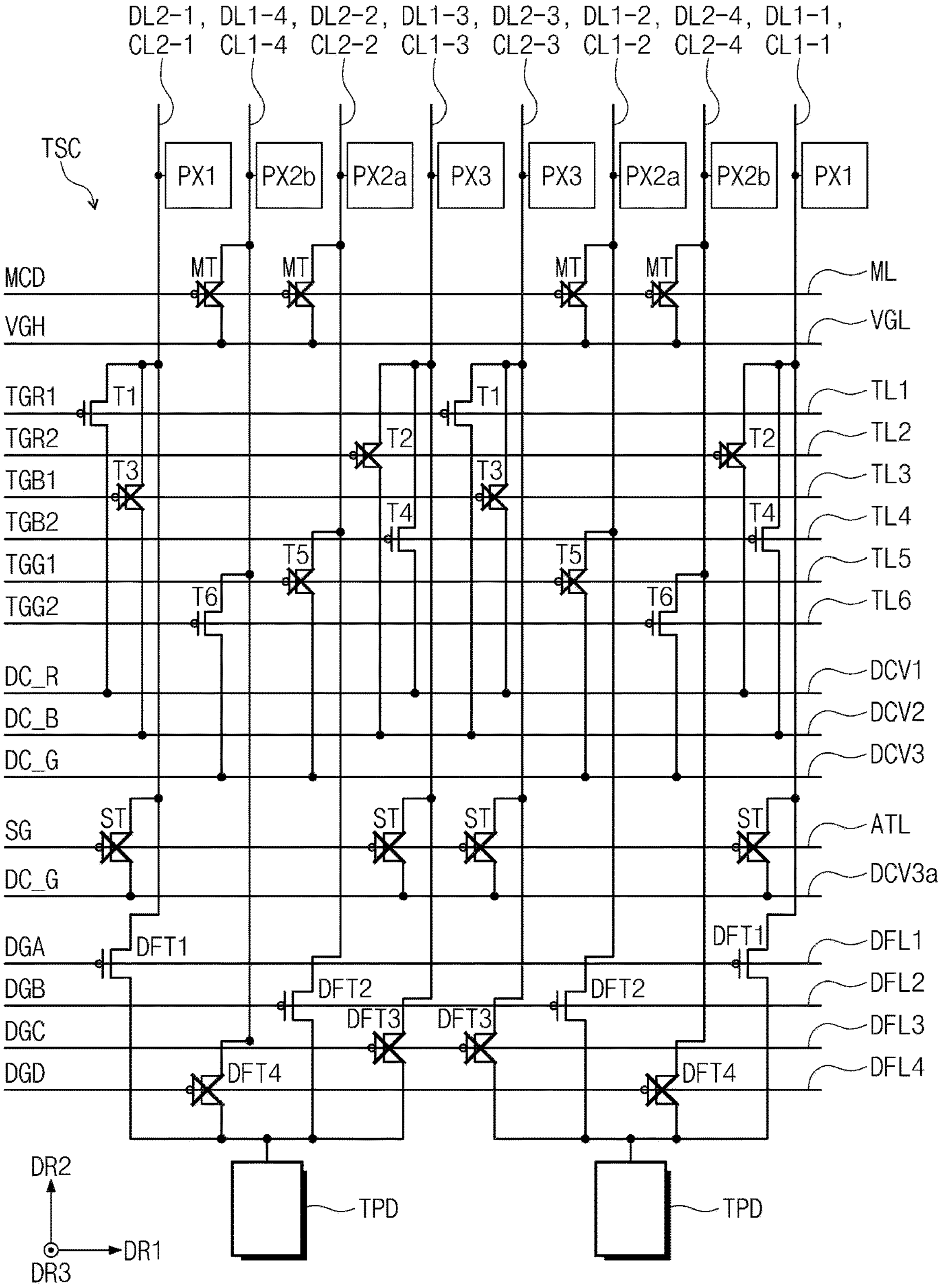
FIG. 7A is a circuit diagram of a portion of an inspection circuit according to an embodiment of the present disclosure.
Figure 7B:
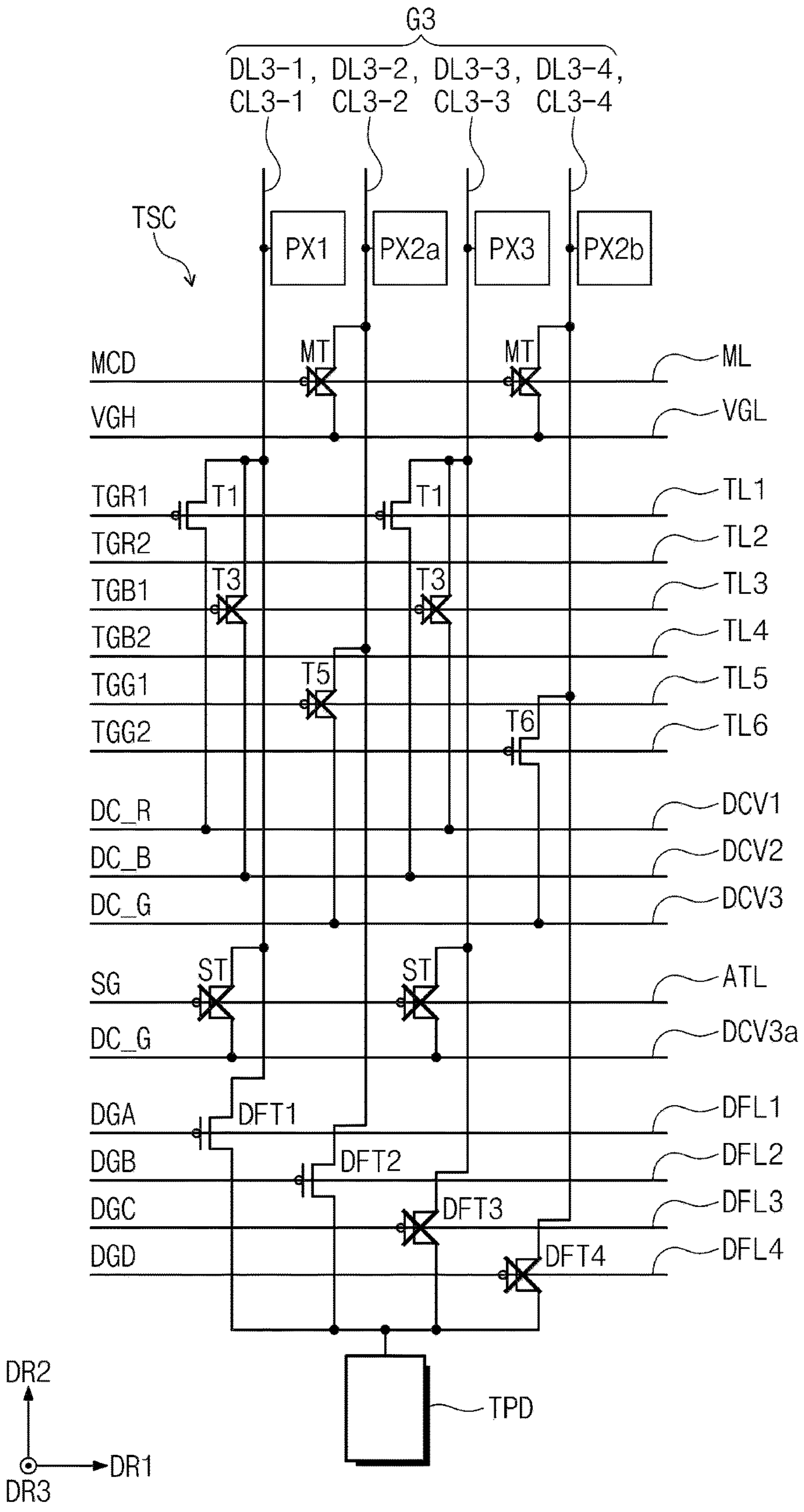
FIG. 7B is a circuit diagram of a portion of an inspection circuit according to an embodiment of the present disclosure.
Figure 8:
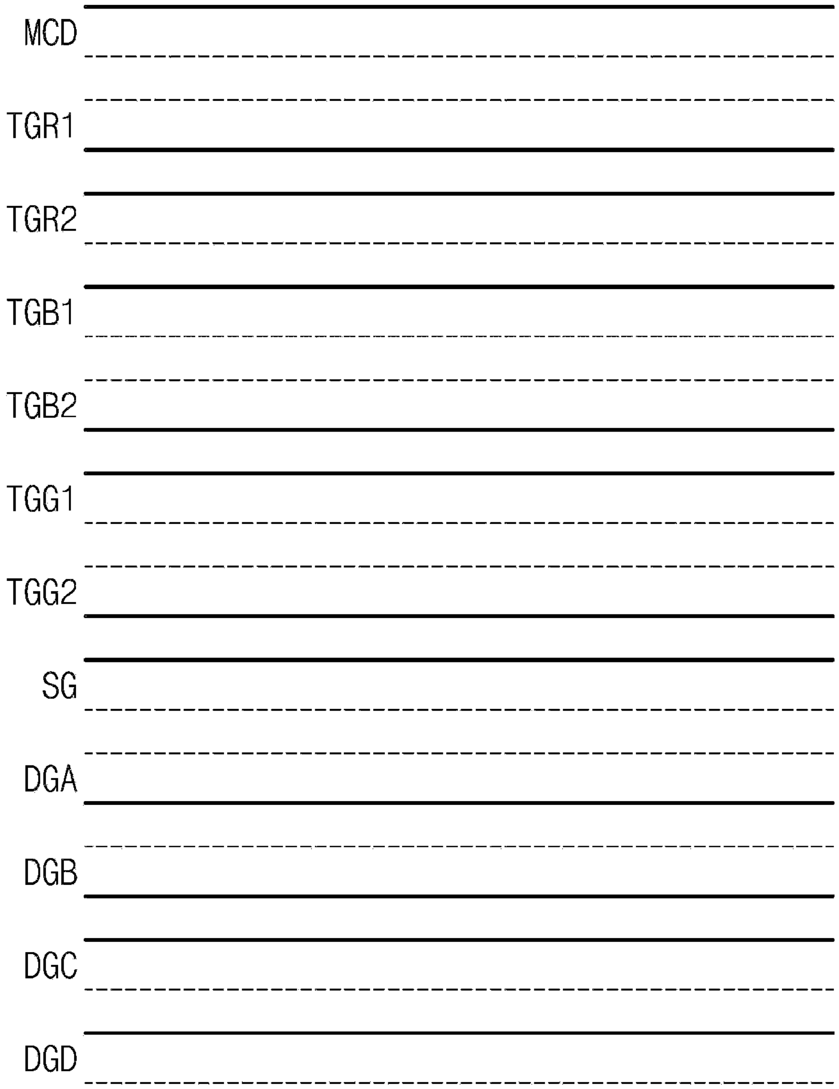
FIG. 8 is a timing diagram illustrating an inspection operation according to an embodiment of the present disclosure.

FIG. 7A is a circuit diagram of a portion of the inspection circuit TSC according to an embodiment of the present disclosure. FIG. 7B is a circuit diagram of a portion of the inspection circuit TSC according to an embodiment of the present disclosure. FIG. 8 is a timing diagram illustrating an inspection operation according to an embodiment of the present disclosure.

Referring to FIGS. 7A, 7B, and 8, when a second inspection is performed on the display panel DP (e.g., refer to FIG. 2), the crack inspection signal MCD, the second inspection signal TGR2, the third inspection signal TGB1, the fifth inspection signal TGG1, the additional inspection signal SG, and the ninth and tenth inspection signals DGC and DGD may have the high level, and the first inspection signal TGR1, the fourth inspection signal TGB2, the sixth inspection signal TGG2, and the seventh and eighth inspection signals DGA and DGB may have the low level. Accordingly, the crack inspection transistors MT, the second, third, and fifth transistors T2, T3, and T5, the additional inspection transistors ST, and the ninth and tenth transistors DFT3 and DFT4 may be turned off, and the first, fourth, and sixth transistors T1, T4, and T6 and the seventh and eighth transistors DFT1 and DFT2 may be turned on. In addition, the non-light-emitting voltage may be provided to the first voltage line DCV1 and the second voltage line DCV2, and the light emitting voltage may be provided to the third voltage line DCV3. In other words, the third lighting voltage DC_G may have the voltage level corresponding to the level of the light emitting voltage, and the first lighting voltage DC_R and the second lighting voltage DC_B may have the voltage level corresponding to the level of the non-light-emitting voltage.

Referring to FIG. 7A, two connection lines, which are most adjacent (e.g., closest) to each other, from among the connection lines CL2-1, CL1-4, CL2-2, CL1-3, CL2-3, CL1-2, CL2-4, and CL1-1 may be respectively connected to the pixels PX that provide light having the same or substantially the same color as each other. As an example, the first-fourth connection line CL1-4 and the second-second connection line CL2-2 may be connected to the second color pixels PX2*b* and PX2*a*, respectively. In addition, the first-second connection line CL1-2 and the second-fourth connection line CL2-4 may be connected to the second color pixels PX2*a* and PX2*b*, respectively. Referring to FIG. 7B, two connection lines, which are most adjacent (e.g., closest) to each other, from among the connection lines CL3-1, CL3-2, CL3-3, and CL3-4 may provide light having different colors from each other.

The second color pixels PX2*a* included in the first, second, and third groups G1, G2, and G3 may be respectively connected to the fifth transistors T5 controlled by the fifth inspection signal TGG1, and the second color pixels PX2*b* included in the first, second, and third groups G1, G2, and G3 may be respectively connected to the sixth transistors T6 controlled by the sixth inspection signal TGG2. The third lighting voltage DC_G may be provided to the first-fourth connection line CL1-4 and the second-second connection line CL2-2 at different timings. In addition, the third lighting voltage DC_G may be provided to the first-second connection line CL1-2 and the second-fourth connection line CL2-4 at different timings.

When the second inspection is performed on the display panel DP, the second lighting voltage DC_B corresponding to the non-light-emitting voltage provided to the second voltage line DCV2 may be provided to the first-second data line DL1-2 via the seventh transistor DFT1 and the eighth transistor DFT2. In addition, the first lighting voltage DC_R corresponding to the non-light-emitting voltage provided to the first voltage line DCV1 may be provided to the second-second data line DL2-2 via the seventh transistor DFT1 and the eighth transistor DFT2. The first lighting voltage DC_R corresponding to the non-light-emitting voltage provided to the first voltage line DCV1 may be provided to the third-second data line DL3-2 via the seventh transistor DFT1 and the eighth transistor DFT2.

Referring to FIG. 7A, in a case where at least one of the first color pixel PX1 connected to the second-first connection line CL2-1 or the second color pixel PX2*a* connected to the second-second connection line CL2-2 emits light when the second color pixel PX2*b* connected to the first-fourth connection line CL1-4 emits light, an occurrence of a short-circuit fault between the connection lines may be detected. In addition, in a case where at least one of the first color pixel PX1 connected to the first-first connection line CL1-1 or the second color pixel PX2*a* connected to the first-second connection line CL1-2 emits light when the second color pixel PX2*b* connected to the second-fourth connection line CL2-4 emits light, an occurrence of a short-circuit fault between the connection lines may be detected.

Referring to FIG. 7B, in a case where the third color pixel PX3 connected to the third-third connection line CL3-3 of one repeat group or the first color pixel PX1 connected to the third-first connection line of a next repeat group emits when the second color pixel PX2*b* connected to the third-fourth connection line CL3-4 of the one repeat group emits light, the occurrence of a short-circuit fault between the connection lines may be detected.

As described above, according to one or more embodiments of the present disclosure, some fan-out lines extending from first data lines of a first group arranged at (e.g., in or on) an outer portion of the display area from among the data lines may be arranged at (e.g., in or on) the display area. Accordingly, a size of a line arrangement area in the non-display area, which is used to connect the first data lines to a data driver, may be reduced.

As described above, according to one or more embodiments of the present disclosure, the emission of a first color pixel connected to the first data line and the emission of a first color pixel connected to the second data line may be controlled by transistors that are controlled in response to different inspection signals from each other. Accordingly, the first lighting voltage may be provided to the first color pixel that is connected to the first data line and the first color pixel that is connected to the second data line at different timings. In a case where the first color pixel connected to the second data line emits light when the first color pixel connected to the first data line emits light, a short-circuit fault that occurs between the lines may be determined. Accordingly, defect detection accuracy with respect to the display panel may be improved, and a manufacturing yield of the display device may be improved.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

a display panel having a display area and a non-display area; and an inspection circuit at the non-display area, wherein the display panel comprises:

a plurality of first data lines sequentially arranged at the display area;

a plurality of first connection lines at the non-display area, and electrically connected to the plurality of first data lines, respectively;

a plurality of second data lines sequentially arranged at the display area; and a plurality of second connection lines at the non-display area, and electrically connected to the plurality of second data lines, respectively, wherein the plurality of first connection lines is alternately arranged with the plurality of second connection lines one by one, wherein the inspection circuit comprises:

a plurality of first transistors configured to be controlled by a first inspection signal of a first inspection line;

a plurality of second transistors configured to be controlled by a second inspection signal of a second inspection line;

a plurality of third transistors configured to be controlled by a third inspection signal of a third inspection line;

a plurality of fourth transistors configured to be controlled by a fourth inspection signal of a fourth inspection line;

a plurality of fifth transistors configured to be controlled by a fifth inspection signal of a fifth inspection line; and a plurality of sixth transistors configured to be controlled by a sixth inspection signal of a sixth inspection line, wherein the plurality of first data lines comprises a first-first data line, a first-second data line, a first-third data line, and a first-fourth data line that are sequentially arranged, wherein the plurality of second data lines comprises a second-first data line, a second-second data line, a second-third data line, and a second-fourth data line that are sequentially arranged, wherein the first-first data line and the first-third data line are electrically connected to the plurality of second transistors, respectively, and electrically connected to the plurality of fourth transistors, respectively, wherein the second-first data line and the second-third data line are electrically connected to the plurality of first transistors, respectively, and electrically connected to the plurality of third transistors, respectively, wherein the first-second data line and the second-second data line are electrically connected to the plurality of fifth transistors, respectively, and wherein the first-fourth data line and the second-fourth data line are electrically connected to the plurality of sixth transistors, respectively.

2. The display device of claim 1, wherein the display panel further comprises a plurality of intermediate connection lines connected between the plurality of first data lines and the plurality of first connection lines, and wherein the plurality of intermediate connection lines is located at the display area.

3. The display device of claim 1, wherein the plurality of first connection lines comprises:

a first-first connection line electrically connected to the first-first data line;

a first-second connection line electrically connected to the first-second data line;

a first-third connection line electrically connected to the first-third data line; and a first-fourth connection line electrically connected to the first-fourth data line, and wherein the first-fourth connection line, the first-third connection line, the first-second connection line, and the first-first connection line are sequentially arranged.

4. The display device of claim 1, wherein the display panel further comprises:

a plurality of first color pixels;

a plurality of second color pixels; and a plurality of third color pixels, wherein each of the first-first data line, the first-third data line, the second-first data line, and the second-third data line is connected to a corresponding first color pixel from among the plurality of first color pixels and a corresponding third color pixel from among the plurality of third color pixels, and wherein each of the first-second data line, the first-fourth data line, the second-second data line, and the second-fourth data line is connected to a corresponding second color pixel from among the plurality of second color pixels.

5. The display device of claim 4, wherein the plurality of first color pixels comprises a red pixel, the plurality of second color pixels comprises a green pixel, and the plurality of third color pixels comprises a blue pixel.

6. The display device of claim 1, wherein the inspection circuit further comprises:

a first voltage line configured to receive a first lighting voltage;

a second voltage line configured to receive a second lighting voltage; and a third voltage line configured to receive a third lighting voltage.

7. The display device of claim 6, wherein each of the plurality of first transistors and the plurality of second transistors is connected to the first voltage line or the second voltage line, wherein each of the plurality of third transistors and the plurality of fourth transistors is connected to the first voltage line or the second voltage line, and wherein each of the plurality of fifth transistors and the plurality of sixth transistors is connected to the third voltage line.

8. The display device of claim 7, wherein a first transistor connected to the second-first data line from among the plurality of first transistors is connected to the first voltage line, wherein a third transistor connected to the second-first data line from among the plurality of third transistors is connected to the second voltage line, wherein a fifth transistor connected to the second-second data line from among the plurality of fifth transistors is connected to the third voltage line, wherein a first transistor connected to the second-third data line from among the plurality of first transistors is connected to the second voltage line, wherein a third transistor connected to the second-third data line from among the plurality of third transistors is connected to the first voltage line, and wherein a sixth transistor connected to the second-fourth data line from among the plurality of sixth transistors is connected to the third voltage line.

9. The display device of claim 8, wherein a second transistor connected to the first-first data line from among the plurality of second transistors is connected to the first voltage line, wherein a fourth transistor connected to the first-first data line from among the plurality of fourth transistors is connected to the second voltage line, wherein a fifth transistor connected to the first-second data line from among the plurality of fifth transistors is connected to the third voltage line, wherein a second transistor connected to the first-third data line from among the plurality of second transistors is connected to the second voltage line, wherein a fourth transistor connected to the first-third data line from among the plurality of fourth transistors is connected to the first voltage line, and wherein a sixth transistor connected to the first-fourth data line from among the plurality of sixth transistors is connected to the third voltage line.

10. The display device of claim 9, wherein, during an inspection of the display panel by the inspection circuit, the first voltage line is configured to receive a light emitting voltage, and the second voltage line and the third voltage line are configured to receive a non-light emitting voltage.

11. The display device of claim 10, wherein, during the inspection of the display panel by the inspection circuit, the plurality of first transistors, the plurality of fourth transistors, the plurality of fifth transistors, and the plurality of sixth transistors are configured to be turned on, and the plurality of second transistors and the plurality of third transistors are configured to be turned off.

12. The display device of claim 9, wherein, during an inspection of the display panel by the inspection circuit, the first voltage line and the second voltage line are configured to receive a non-light-emitting voltage, and the third voltage line is configured to receive a light emitting voltage.

13. The display device of claim 12, wherein, during the inspection of the display panel by the inspection circuit, the plurality of first transistors, the plurality of fourth transistors, and the plurality of sixth transistors are configured to be turned on, and the plurality of second transistors, the plurality of third transistors, and the plurality of fifth transistors are configured to be turned off.

14. The display device of claim 13, wherein the inspection circuit further comprises:

a plurality of seventh transistors configured to be controlled by a seventh inspection signal of a seventh inspection line;

a plurality of eighth transistors configured to be controlled by an eighth inspection signal of an eighth inspection line;

a plurality of ninth transistors configured to be controlled by a ninth inspection signal of a ninth inspection line; and a plurality of tenth transistors configured to be controlled by a tenth inspection signal of a tenth inspection line, wherein the plurality of seventh transistors is electrically connected to the first-first data line and the second-first data line, respectively, wherein the plurality of eighth transistors is electrically connected to the first-second data line and the second-second data line, respectively, wherein the plurality of ninth transistors is electrically connected to the first-third data line and the second-third data line, respectively, and the plurality of tenth transistors is electrically connected to the first-fourth data line and the second-fourth data line, respectively.

15. The display device of claim 14, wherein, during an inspection of the display panel by the inspection circuit, the plurality of seventh transistors and the plurality of eighth transistors are configured to be turned on, and the plurality of ninth transistors and the plurality of tenth transistors are configured to be turned off.

16. The display device of claim 15, wherein, during the inspection of the display panel by the inspection circuit, the first-second data line is configured to receive the non-light-emitting voltage from the second voltage line via a seventh transistor electrically connected to the first-first data line from among the plurality of seventh transistors, and an eighth transistor electrically connected to the first-second data line from among the plurality of eighth transistors, and wherein, during the inspection, the second-second data line is configured to receive the non-light-emitting voltage from the first voltage line via a seventh transistor electrically connected to the second-first data line from among the plurality of seventh transistors, and an eighth transistor electrically connected to the second-second data line from among the plurality of eighth transistors.

17. A display device comprising:

a display panel having a display area and a non-display area; and an inspection circuit at the non-display area, and comprising a plurality of transistors, wherein the display panel comprises:

a plurality of pixels comprising a plurality of first color pixels, a plurality of second color pixels, and a plurality of third color pixels;

a plurality of first data lines sequentially arranged at the display area along a first direction;

a plurality of first connection lines electrically connected to the plurality of first data lines, respectively, and arranged at the non-display area along a direction opposite to the first direction;

a plurality of second data lines at the display area along the first direction; and a plurality of second connection lines electrically connected to the plurality of second data lines, respectively, and arranged at the non-display area along the first direction, wherein first color pixels connected to the first data lines from among the plurality of first color pixels and first color pixels connected to the second data lines from among the plurality of first color pixels are electrically connected to a plurality of first transistors and a plurality of second transistors, respectively, from among the plurality of transistors of the inspection circuit, the plurality of first transistors and the plurality of second transistors being configured to be controlled by different inspection signals, and wherein third color pixels connected to the plurality of first data lines from among the plurality of third color pixels and third color pixels connected to the plurality of second data lines from among the plurality of third color pixels are electrically connected to a plurality of third transistors and a plurality of fourth transistors, respectively, from among the plurality of transistors of the inspection circuit, the plurality of third transistor and the plurality of fourth transistors being configured to be controlled by different inspection signals.

18. The display device of claim 17, wherein some of the second color pixels and others of the second color pixels from among the plurality of second color pixels are electrically connected to a plurality of fifth transistors and a plurality of sixth transistors, respectively, from among the plurality of transistors of the inspection circuit, the plurality of fifth transistors and the plurality of sixth transistors being configured to be controlled by different inspection signals.

19. The display device of claim 17, wherein the plurality of first data lines comprises a first-first data line, a first-second data line, a first-third data line, and a first-fourth data line that are sequentially arranged, wherein the plurality of second data lines comprises a second-first data line, a second-second data line, a second-third data line, and a second-fourth data line, that are sequentially arranged, wherein the plurality of first connection lines comprises a first-first connection line electrically connected to the first-first data line, a first-second connection line electrically connected to the first-second data line, a first-third connection line electrically connected to the first-third data line, and a first-fourth connection line electrically connected to the first-fourth data line, and wherein the first-fourth connection line, the first-third connection line, the first-second connection line, and the first-first connection line are sequentially arranged.

20. The display device of claim 17, wherein the display panel comprises a plurality of intermediate connection lines connected between the plurality of first data lines and the plurality of first connection lines, and wherein the plurality of intermediate connection lines are located at the display area.

* * * * *